United States Patent
Chen et al.

(10) Patent No.: US 11,671,212 B2
(45) Date of Patent: Jun. 6, 2023

(54) TRANSMISSION METHOD AND APPARATUS, UPLINK RECEIVING METHOD AND APPARATUS, AND FEEDBACK STRATEGY DETERMINATION METHOD AND APPARATUS

(71) Applicant: ZTE CORPORATION, Guangdong (CN)

(72) Inventors: Yijian Chen, Guangdong (CN); Zhaohua Lu, Guangdong (CN); Fusheng Zhu, Guangdong (CN)

(73) Assignee: ZTE CORPORATION, Guangdong (CN)

(*) Notice: Subject to any disclaimer, the term of this patent is extended or adjusted under 35 U.S.C. 154(b) by 201 days.

(21) Appl. No.: 17/044,103

(22) PCT Filed: Apr. 3, 2019

(86) PCT No.: PCT/CN2019/081326
§ 371 (c)(1),
(2) Date: Sep. 30, 2020

(87) PCT Pub. No.: WO2019/192537
PCT Pub. Date: Oct. 10, 2019

(65) Prior Publication Data
US 2021/0385028 A1    Dec. 9, 2021

(30) Foreign Application Priority Data

Apr. 4, 2018    (CN) .......................... 201810297261.2

(51) Int. Cl.
*H04L 1/1867*  (2023.01)
*H04L 1/00*    (2006.01)
(Continued)

(52) U.S. Cl.
CPC .......... *H04L 1/1896* (2013.01); *H04L 1/0025* (2013.01); *H04W 72/1263* (2013.01); *H04W 72/23* (2023.01)

(58) Field of Classification Search
CPC ... H04L 1/0025; H04L 1/1607; H04L 1/1614; H04L 1/1829; H04L 1/1896;
(Continued)

(56) References Cited

U.S. PATENT DOCUMENTS 10,574,309 B2 *  2/2020  Akkarakaran ........ H04L 1/1671
10,757,690 B2 *  8/2020  Sun ....................... H04L 1/0079
(Continued)

FOREIGN PATENT DOCUMENTS

CN    102685898 A  *  9/2012
CN    102685898 A      9/2012
(Continued)

OTHER PUBLICATIONS

First Office Action issued in CN201810297261.2, dated Dec. 3, 2021, four (4) page(s).
(Continued)

*Primary Examiner* — Eric Nowlin
(74) *Attorney, Agent, or Firm* — KDW Firm PLLC

(57) ABSTRACT

In the related art, a data transmission cannot be normally performed between two communication ends, if the two levels of control information cannot be correctly received, a transmission method is included in the communication method provided in the embodiments of the present disclosure. In the transmission method, a terminal receives, through a first control channel, first control information sent by a base station; and in a case of not obtaining second control information from the base station, the terminal determines a transmission configuration parameter of a data channel according to the first control information and preset
(Continued)

control information, and performs a data transmission with the base station according to the transmission configuration parameter of the data channel.

17 Claims, 4 Drawing Sheets

(51) Int. Cl.
*H04W 72/1263* (2023.01)
*H04W 72/23* (2023.01)

(58) Field of Classification Search
CPC ... H04W 28/04; H04W 28/18; H04W 72/042; H04W 72/1263
See application file for complete search history.

(56) References Cited

U.S. PATENT DOCUMENTS

| | | | | |
|---|---|---|---|---|
| 11,082,096 B2* | 8/2021 | Akkarakaran | ....... | H04B 7/0645 |
| 11,160,088 B2* | 10/2021 | Li | ....... | H04L 5/0053 |
| 11,438,106 B2* | 9/2022 | Hwang | ....... | H04L 1/1819 |
| 11,470,607 B2* | 10/2022 | Kwak | ....... | H04L 5/0044 |
| 11,502,784 B2* | 11/2022 | Zou | ....... | H04L 1/1896 |
| 2010/0331030 A1 | 12/2010 | Nory | ....... | H04W 72/042 455/63.1 |
| 2014/0348110 A1* | 11/2014 | Wang | ....... | H04L 1/0041 370/329 |
| 2015/0063231 A1 | 3/2015 | Seo et al. | | |
| 2016/0128028 A1* | 5/2016 | Mallik | ....... | H04L 1/0039 370/336 |
| 2017/0251465 A1* | 8/2017 | Andersson | ....... | H04W 72/042 |
| 2017/0251466 A1* | 8/2017 | Astely | ....... | H04W 72/042 |
| 2018/0027541 A1* | 1/2018 | Wu | ....... | H04L 5/0048 370/329 |
| 2018/0124753 A1* | 5/2018 | Sun | ....... | H04W 72/042 |
| 2018/0302128 A1* | 10/2018 | Akkarakaran | ....... | H04B 7/0421 |
| 2019/0116594 A1* | 4/2019 | Kwak | ....... | H04L 5/0044 |
| 2019/0357224 A1* | 11/2019 | Li | ....... | H04L 1/1893 |
| 2019/0364548 A1* | 11/2019 | Nammi | ....... | H04L 1/0072 |
| 2019/0372743 A1* | 12/2019 | Takeda | ....... | H04L 5/0053 |
| 2019/0386780 A1* | 12/2019 | Zou | ....... | H04L 1/1896 |
| 2020/0015209 A1* | 1/2020 | Zhang | ....... | H04L 1/1864 |
| 2020/0100219 A1* | 3/2020 | Takeda | ....... | H04L 1/08 |
| 2020/0367272 A1* | 11/2020 | Ge | ....... | H04W 72/20 |
| 2021/0028893 A1* | 1/2021 | Hwang | ....... | H04W 72/042 |
| 2021/0321439 A1* | 10/2021 | Sakhnini | ....... | H04L 5/0091 |
| 2021/0328731 A1* | 10/2021 | Park | ....... | H04L 1/08 |
| 2021/0329680 A1* | 10/2021 | Wu | ....... | H04L 1/0045 |
| 2021/0345337 A1* | 11/2021 | Ma | ....... | H04W 72/1289 |
| 2021/0345387 A1* | 11/2021 | Gurelli | ....... | H04L 5/0094 |
| 2021/0345392 A1* | 11/2021 | Ma | ....... | H04L 27/2601 |
| 2021/0352631 A1* | 11/2021 | Fan | ....... | H04L 5/0048 |
| 2021/0352702 A1* | 11/2021 | Ma | ....... | H04L 1/0004 |
| 2021/0360675 A1* | 11/2021 | Yerramalli | ....... | H04L 5/0094 |
| 2022/0086840 A1* | 3/2022 | Gurelli | ....... | H04W 72/0493 |
| 2022/0248446 A1* | 8/2022 | Zewail | ....... | H04L 5/0048 |
| 2022/0256543 A1* | 8/2022 | Tian | ....... | H04L 5/0091 |
| 2022/0322403 A1* | 10/2022 | Khoshnevisan | ....... | H04B 7/0456 |

FOREIGN PATENT DOCUMENTS

| | | | | |
|---|---|---|---|---|
| CN | 103248450 A | | 8/2013 | |
| CN | 103248450 A | * | 8/2013 | ........... H04L 1/0041 |
| CN | 107241801 A | | 10/2017 | |
| CN | 108282879 A | * | 7/2018 | ........... H04B 17/345 |
| CN | 109923811 A | * | 6/2019 | ........... H04L 1/0079 |
| CN | 110138524 A | * | 8/2019 | ........... H04L 1/0023 |
| CN | 110463113 A | * | 11/2019 | ........... H04L 1/1657 |
| CN | 109923811 B | * | 11/2021 | ........... H04L 1/0079 |
| EP | 3602889 A1 | * | 2/2020 | ........... H04L 1/1657 |
| EP | 3742643 A1 | * | 11/2020 | ........... H04L 1/0023 |
| JP | 2019537343 A | * | 12/2019 | ............ H04W 28/06 |
| JP | 6827537 B2 | * | 2/2021 | ........... H04L 1/0079 |
| KR | 102258539 B1 | * | 5/2021 | ............ H04W 28/06 |
| TW | I778336 B | * | 9/2022 | |
| WO | 2016145594 A1 | | 9/2016 | |
| WO | 2017076362 A1 | | 5/2017 | |
| WO | WO-2018085429 A1 | * | 5/2018 | ........... H04L 1/0079 |
| WO | WO-2018126932 A1 | * | 7/2018 | ........... H04B 17/345 |
| WO | WO-2018172862 A1 | * | 9/2018 | ........... H04L 1/1657 |
| WO | WO-2019154003 A1 | * | 8/2019 | ........... H04L 1/0023 |
| WO | WO-2019182349 A1 | * | 9/2019 | ........... H04B 7/0695 |
| WO | WO-2020039482 A1 | * | 2/2020 | |
| WO | WO-2022109146 A1 | * | 5/2022 | |
| WO | WO-2022211965 A2 | * | 10/2022 | ............... H04L 5/00 |

OTHER PUBLICATIONS

First Search Report issued in CN201810297261.2, three (3) page(s).
Huawei et al.: "DCI design for short TTI", 3GPP Draft; R1-164060, 3rd Generation Partnership Project (3GPP), Mobile Competence Centre; 650, Route Des Lucioles; F-06921 Sophia-Antipolis Cedex; France; vol. RAN WG1, no. Nanjing, China; 20160523-20160527; May 14, 2016 (May 14, 2016), XP051096624, Retrieved from the Internet: URL:http://www.3gpp.org/ftp/tsg_ran/WG1_RL1/TSGR1_85/Docs/ [retrieved on May 14, 2016].
Intel Corporation: "Downlink control signaling design for shorten TTI", 3GPP Draft; R1-164160, 3rd Generation Partnership Project (3GPP), Mobile Competence Centre; 650, Route Des Lucioles; F-06921 Sophia-Antipolis Cedex; France; vol. RAN WG1, no. Nanjing, China; 20160523-20160527; May 14, 2016 (May 14, 2016), XP051096558, Retrieved from the Internet: URL:http://www.3gpp.org/ftp/tsg_ran/WG1_RL1/TSGR1_85/Docs/ [retrieved on May 14, 2016].
Samsung: "sPDCCH and sDCI design", 3GPP Draft; R1-164793-sPDCCH and sDCI design, 3rd Generation Partnership Project (3GPP), Mobile Competence Centre; 650, Route Des Lucioles; F-06921 Sophia-Antipolis Cedex; France; vol. RAN WGI, no. Nanjing, China; 20160523-20160527; May 14, 2016 (May 14, 2016), XP051096324, Retrieved from the Internet: URL:http://www.3gpp.org/ftp/tsg_ran/WG1_RL1/TSGR1_85/Docs/ [retrieved on May 14, 2016].
Partial European Search Report for the European Application No. EP19781051, dated Dec. 21, 2021, 16 pages.
Zte et al., "Discussion on Control Channel Design for NR," 3GPP TSG RAN WG1 Meeting #86bis, R1-1608676, Oct. 14, 2016.
Huawei et al., "Downlink Control Channel Structures," 3GPP TSG RAN Wg1 Meeting #87, R1-1611207, Nov. 18, 2016.
International Search Report for Application No. PCT/CN2019/081326, dated Jun. 27, 2019, 2 pages.

* cited by examiner

TRANSMISSION METHOD AND APPARATUS, UPLINK RECEIVING METHOD AND APPARATUS, AND FEEDBACK STRATEGY DETERMINATION METHOD AND APPARATUS

CROSS-REFERENCE TO RELATED APPLICATIONS

This is a National Stage Application, filed under 35 U.S.C. 371, of International Patent Application No. PCT/CN2019/081326, filed on Apr. 3, 2019, which claims priority to Chinese Patent Application No. 201810297261.2 filed on Apr. 4, 2018, contents of both of which are incorporated herein by reference in their entireties.

TECHNICAL FIELD

The present disclosure relates to the field of communications and, in particular, to a transmission method and apparatus, an uplink receiving method and apparatus, and a feedback strategy determination method and apparatus.

BACKGROUND

On one hand, in the related art, two levels of control channels are generally used for sending control information: a sending end uses a first control channel L1 to carry first control information and uses a first transmission configuration for the first control channel L1; meanwhile, the sending end uses a second control channel L2 to carry second control information and uses a second transmission configuration for the second control channel L2. The first control information transmitted on the first control channel L1 and the second control information transmitted on the second control channel L2 are used for indicating the transmission configuration of a data channel. However, the second control channel L2 is generally not as robust as the first control channel L1, and the second control channel L2 has a higher probability of transmission errors. Therefore, although the block error rate (BLER) of the first control channel L1 is lower than the BLER of the second control channel L2, and the first control information is more likely to be received correctly, the overall data transmission efficiency will be encumbered since the second control information may not be received correctly.

On the other hand, since the transmission configuration of different transport blocks can be determined by combining one piece of the first control information with different second control information, the sending end can send one piece of the first control information and a plurality of different pieces of the second control information to indicate a receiving end to receive, through these multiple transport blocks, the data sent by the sending end itself. However, since no corresponding feedback mechanism is provided for the transmission scenario in the related art, the sending end does not know the situation of the receiving end receiving these control information, and does not know the situation of the receiving end receiving the data sent by the sending end itself, either.

SUMMARY

In an embodiment, the present disclosure provides a transmission method and apparatus, an uplink receiving method and apparatus, a terminal, a base station, and a storage medium, so as to avoid the situation that the data transmission efficiency is affected due to the fact that the data transmission cannot be normally performed between two communication ends if one piece of information among the two levels of control information cannot be correctly received. In an embodiment, the present disclosure provides a feedback strategy determination method and apparatus, a terminal, and a storage medium, so as to avoid the situation that a sending end cannot know the receiving situation of control information and data at a receiving end when the sending end sends one piece of first control information and two pieces of second control information. The present disclosure provides a transmission method. The method includes steps described below.

First control information sent by a base station is received through a first control channel.

When second control information is not obtained from the base station, a transmission configuration parameter of a data channel is determined according to the first control information and preset control information.

A data transmission is performed according to the transmission configuration parameter of the data channel.

The first control information and the second control information are used for jointly indicating a transmission configuration of the data channel; or the first control information and the preset control information are used for jointly indicating a transmission configuration of the data channel. Alternatively, the case of not obtaining the second control information from the base station includes one of cases described below.

A case one: the first control information includes a presence indication used for indicating presence of the second control information, but the second control information is not correctly detected.

A case two: the first control information does not include a presence indication used for indicating presence of the second control information.

Alternatively, the preset control information includes first preset control information pre-agreed with the base station and second preset control information received from a higher layer.

For the case one, the step of determining the transmission configuration parameter of the data channel according to the first control information and the preset control information includes: determining the transmission configuration parameter of the data channel according to the first control information and the second preset control information.

For the case two, the step of determining the transmission configuration parameter of the data channel according to the first control information and the preset control information includes: determining the transmission configuration parameter of the data channel according to the first control information and the first preset control information.

The present disclosure further provides an uplink receiving method. The method includes steps described below.

First control information is sent to a terminal through a first control channel.

A transmission configuration parameter of a data channel for performing a data transmission with the terminal is determined according to the first control information and preset control information.

Data sent by the terminal is received through the transmission configuration parameter.

The first control information and the preset control information jointly indicate a transmission configuration of the data channel.

Alternatively, the preset control information includes first preset control information pre-agreed with a base station and second preset control information received from a higher layer.

The step in which the transmission configuration parameter of the data channel for performing the data transmission with the terminal is determined according to the first control information and the preset control information includes steps described below.

When the first control information includes a presence indication used for indicating presence of second control information, the transmission configuration parameter of the data channel for performing the data transmission with the terminal is determined according to the first control information and the second preset control information.

When the first control information does not include the presence indication used for indicating the presence of the second control information, the transmission configuration parameter of the data channel for performing the data transmission with the terminal is determined according to the first control information and the first preset control information.

Alternatively, when the first control information includes the presence indication used for indicating the presence of the second control information,
before the transmission configuration parameter of the data channel for performing the data transmission with the terminal is determined according to the first control information and the preset control information, the method further includes steps described below, after the data sent by the terminal is received through a data channel indicated by the first control information and the second control information, a check is performed on a data receiving result and it is determined that the check on the data receiving result fails; or
after the data sent by the terminal is received through the transmission configuration parameter of the data channel, the method further includes steps described below, a check is performed on a data receiving result, and when the check on the data receiving result fails, the data sent by the terminal is received through a data channel indicated by the first control information and the second control information; or
when receiving the data sent by the terminal through the transmission configuration parameter of the data channel, the method further includes a step described below, the data sent by the terminal is received through a data channel indicated by the first control information and the second control information.

The present disclosure further provides a feedback strategy determination method. The method includes steps described below.

An information receiving result and a data receiving result are acquired, the information receiving result includes a receiving result of first control information sent by a base station on a first channel and a receiving result of second control information sent by the base station on a second channel, and the data receiving result includes a receiving result of data on a first transport block. A feedback strategy of a downlink receiving state is determined according to the information receiving result and the data receiving result.

The first control information and the second control information are used for collectively indicating a transmission configuration of the first transport block.

Alternatively, the step of determining the feedback strategy of the downlink receiving state according to the information receiving result and the data receiving result includes determining indication information for feedback according to one of modes described below.

A mode one: the indication information includes a first control indication, a second control indication and a data receiving indication, the first control indication is determined according to the receiving result of the first control information, the second control indication is determined according to the receiving result of the second control information, and the data receiving indication is determined according to the receiving result of the data on the first transport block.

A mode two: the indication information includes a control indication and a data receiving indication, the control indication is determined according to the information receiving result, and the data receiving indication is determined according to the data receiving result.

A mode three: the indication information includes a first control indication and an information data indication, the first control indication is determined according to the receiving result of the first control information, and the information data indication is determined according to the receiving result of the second control information and the data receiving result.

Alternatively, before determining the feedback strategy of the downlink receiving state according to the information receiving result and the data receiving result, the method further includes steps described below.

Feature information about the second control information is acquired, and one of the mode one, the mode two or the mode three is selected according to the feature information to determine the feedback strategy of the downlink receiving state; or
one of the mode one, the mode two or the mode three is selected according to feedback mode indication information sent by the base station to determine the feedback strategy of the downlink receiving state.

Alternatively, the information receiving result further includes a receiving result of third control information sent by the base station on a third channel, and the data receiving result further includes a receiving result of data on a second transport block; and the first control information and the third control information are used for collectively indicating a transmission configuration of the second transport block.

Alternatively, the step of determining the feedback strategy of the downlink receiving state according to the information receiving result and the data receiving result includes a step described below.

According to the information receiving result and the data receiving result, the feedback strategy of the downlink receiving state is determined based on using a feedback principle one, or according to the information receiving result and the data receiving result, the feedback strategy of the downlink receiving state is determined based on using a feedback principle two.

The feedback principle one includes: feeding back, through one uplink control channel resource, a downlink receiving state corresponding to the first transport block and a downlink receiving state corresponding to the second transport block to the base station.

The feedback principle two includes: feeding back, through a first uplink control channel resource corresponding to the first transport block, the downlink receiving state corresponding to the first transport block to the base station, and feeding back, through a second uplink control channel resource corresponding to the second transport block, the downlink receiving state corresponding to the second transport block to the base station.

Alternatively, the step in which according to the information receiving result and the data receiving result, the feedback strategy of the downlink receiving state is determined based on using the feedback principle one includes a step described below.

Indication information which is fed back to the base station through the uplink control channel resource is determined, the indication information is used for representing the downlink receiving state situation corresponding to the first transport block and the downlink receiving state situation corresponding to the second transport block, when data on a transport block is successfully received, indication information includes a success identifier corresponding to the transport block, and when data on a transport block fails to be successfully received, the indication information includes a failure identifier corresponding to the transport block.

Alternatively, the information receiving result includes a first information receiving result corresponding to the first control information, a second information receiving result corresponding to the second control information, and a third information receiving result corresponding to the third control information, and the first information receiving result is a success; and the data receiving result includes a first data receiving result corresponding to the first transport block and a second data receiving result corresponding to the second transport block. The step in which according to the information receiving result and the data receiving result, the feedback strategy of the downlink receiving state is determined based on using the feedback principle one includes steps described below.

A state combination of the first information receiving result, the second information receiving result, the third information receiving result, the first data receiving result and the second data receiving result, which are all in current downlink receiving, is determined.

Target indication information matching the state combination of the current downlink receiving is determined according to a preset correspondence between a state combination and indication information.

Alternatively, the step in which according to the information receiving result and the data receiving result, the feedback strategy of the downlink receiving state is determined based on using the feedback principle two comprises includes a step described below.

Indication information for representing the downlink receiving state corresponding to the first transport block is determined to be fed back through the first uplink control channel resource to the base station, and indication information for representing the downlink receiving state corresponding to the second transport block is determined to be fed back through the second uplink control channel resource to the base station; when data on a transport block is successfully received, indication information corresponding to the transport block includes a success identifier; and when the data on the transport block fails to be successfully received, the indication information corresponding to the transport block includes a failure identifier.

Alternatively, the information receiving result includes a first information receiving result corresponding to the first control information, a second information receiving result corresponding to the second control information, and a third information receiving result corresponding to the third control information, and the first information receiving result is a success; and the data receiving result includes a first data receiving result corresponding to the first transport block and a second data receiving result corresponding to the second transport block. The step in which according to the information receiving result and the data receiving result, the feedback strategy of the downlink receiving state is determined based on using the feedback principle two includes steps described below.

When the second information receiving result is a failure, it is determined not to feed back the downlink receiving state corresponding to the first transport block to the base station; otherwise, when the first data receiving result is a success, it is determined to feed back indication information including a success identifier through the first uplink control channel resource to the base station, or when the first data receiving result is a failure, it is determined to feed back indication information including a failure identifier through the first uplink control channel resource to the base station.

When the third information receiving result is a failure, it is determined not to feed back the downlink receiving state corresponding to the second transport block to the base station; otherwise, when the second data receiving result is a success, it is determined to feed back the indication information including the success identifier through the second uplink control channel resource to the base station, or when the second data receiving result is a failure, it is determined to feed back the indication information including the failure identifier through the second uplink control channel resource to the base station.

Alternatively, before determining the feedback strategy of the downlink receiving state according to the information receiving result and the data receiving result, the method further includes steps described below.

Feature information about the second control information and/or the third control information is acquired, and it is determined, according to the feature information, whether the feedback principle one or the feedback principle two is used to determine the feedback strategy of the downlink receiving state, or it is determined, according to feedback principle indication information sent by the base station, whether the feedback principle one or the feedback principle two is used to determine the feedback strategy of the downlink receiving state.

Alternatively, the feature information includes an information content and/or a transmission channel type.

The present disclosure further provides a transmission apparatus. The apparatus includes an information receiving module, a channel determination module, and a data transmission module. The information receiving module is configured to receive, through a first control channel, first control information sent by a base station.

The channel determination module is configured to: in a case of not obtaining second control information from the base station, determine a transmission configuration parameter of a data channel according to the first control information and preset control information; where the first control information and the second control information are used for jointly indicating a transmission configuration of the data channel, or the first control information and the preset control information are used for jointly indicating a transmission configuration of the data channel. The data transmission module is configured to perform a data transmission according to the transmission configuration parameter of the data channel.

The present disclosure further provides an uplink receiving apparatus. The apparatus includes an information sending module and a data receiving module.

The information sending module is configured to send, through a first control channel, first control information to a terminal.

The data receiving module is configured to: determine, according to the first control information and preset control information, a transmission configuration parameter of a data channel for performing a data transmission with the terminal, and receive, through the transmission configuration parameter, data sent by the terminal; and the first control information and the preset control information jointly indicate a transmission configuration of the data channel.

The present disclosure further provides a feedback strategy determination apparatus. The apparatus includes a result acquisition module and a strategy determination module.

The result acquisition module is configured to acquire an information receiving result and a data receiving result; the information receiving result includes a receiving result of first control information sent by a base station on a first channel and a receiving result of second control information sent by the base station on a second channel, and the data receiving result includes a receiving result of data on a first transport block; and the first control information and the second control information are used for collectively indicating a transmission configuration of the first transport block.

The strategy determination module is configured to determine a feedback strategy of a downlink receiving state according to the information receiving result and the data receiving result.

The present disclosure further provides a terminal. The terminal includes a first processor, a first memory, and a first communication bus.

The first communication bus is configured to implement a connection communication between the first processor and the first memory.

The first processor is configured to execute a transmission program stored in the first memory to implement steps in the transmission method according to any embodiment described above; or the first processor is configured to execute a feedback strategy determination program stored in the first memory to implement steps in the feedback strategy determination method according to any embodiment described above.

The present disclosure further provides a base station. The base station includes a second processor, a second memory, and a second communication bus.

The second communication bus is configured to implement a connection communication between the second processor and the second memory.

The second processor is configured to execute an uplink receiving program stored in the second memory to implement steps in the uplink receiving method according to any embodiment described above.

The present disclosure further provides a storage medium. The storage medium is configured to store at least one of a transmission program, an uplink receiving program, or a feedback strategy determination program, the transmission program is executable by at least one processor to implement steps in the transmission method according to any embodiment described above; the uplink receiving program is executable by at least one processor to implement steps in the transmission method according to any embodiment described above; and the feedback strategy determination program is executable by at least one processor to implement steps in the feedback strategy determination method according to any embodiment described above.

In the related art, the data transmission cannot be normally performed between two communication ends if all control information in the two levels of control information cannot be correctly received, the present disclosure provides the transmission method. In the method, the terminal receives, through the first control channel, the first control information sent by the base station; in the case of not obtaining the second control information from the base station, the terminal determines the transmission configuration parameter of the data channel according to the first control information and the preset control information; and the terminal performs the data transmission with the base station according to the transmission configuration parameter of the data channel. In this case, even if the terminal does not correctly receive the second control information sent by the base station, the terminal may replace the second control information with the preset control information, and the terminal combines the preset control information with the first control information to determine the transmission configuration parameter of the data channel, so as to achieve the data transmission. In addition, the embodiments of the present disclosure further provide the uplink receiving method. In the method, after sending the first control information to the terminal, the base station may use the first control information and the preset control information to receive the data sent by the terminal, so as to ensure that the base station can still receive the data sent by the terminal when the terminal fails to obtain the second control information, thus ensuring that the data transmission between the terminal and the base station can continue and improving the data transmission efficiency. In the related art, the sending end cannot know the receiving situation of control information and data at the receiving end when the sending end sends one piece of first control information and two pieces of second control information, the present disclosure provides the feedback strategy determination method. In the method, the terminal first acquires the information receiving result and the data receiving result and then determines the feedback strategy of the downlink receiving state according to the information receiving result and the data receiving result. Feedback according to the strategy can enable the base station to know the receiving situation of control information and data on the terminal side, improving the understanding of the base station about the transmission situation, facilitating the determination by the base station of an effective transmission strategy for subsequent transmission, and ensuring the data transmission efficiency.

Other features of the present disclosure and corresponding beneficial effects are set forth later in the description, and it should be understood that at least part of the beneficial effects become apparent from the description of the present disclosure.

DETAILED DESCRIPTION

To make the object, schemes and advantages of the present disclosure clearer, the present disclosure will be described in detail in conjunction with embodiments and drawings. It should be understood that the embodiments described herein are intended to explain and not to limit the present disclosure.

The communication method provided in the embodiments of the present disclosure includes a transmission method, an uplink receiving method, and a feedback strategy determination method. Correspondingly, a communication apparatus also includes a transmission apparatus, an uplink receiving apparatus, and a feedback strategy determining apparatus. The communication method and apparatus will be described below in detail in conjunction with the embodiments.

Embodiment One

Figure 1:
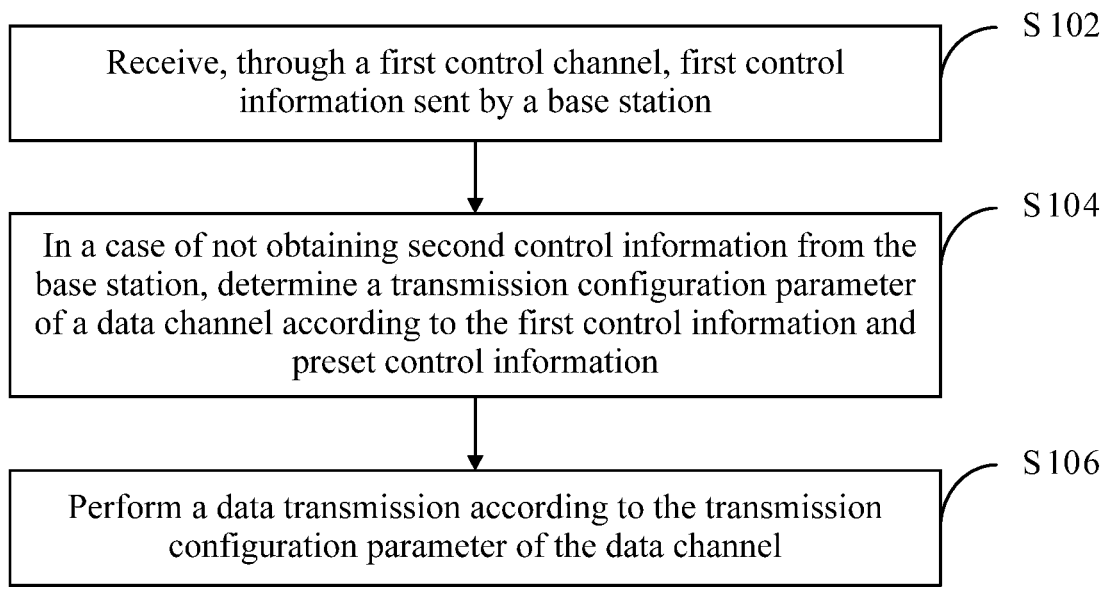
FIG. 1 is a flowchart of a transmission method according to an embodiment one of the present disclosure.

An embodiment provides a transmission method which may be applied to a terminal to improve that the data transmission efficiency is affected due to the fact that the data transmission cannot be normally performed between two communication ends if one piece of information among the two levels of control information cannot be correctly received, when the two levels of control information are used to indicate the transmission configuration of a data channel. The flowchart of the transmission method provided in FIG. 1 can be seen below.

In S102, first control information sent by a base station is received through a first control channel. The first control information may be used for indicating a part of the transmission configuration of a data channel. It should be understood that when two pieces of transmission configuration information are required for indicating the transmission configuration of the data channel, a terminal cannot correctly determine the data channel by receiving merely one piece of control information. Assuming that four transmission configuration items A, B, C and D are required for determining a data channel, it can be understood that if the configuration value of any one of the four transmission configuration items A, B, C and D changes, the determined data channel will be different. The first control information merely includes a configuration value A1 of the transmission configuration item A and a configuration value B1 of the transmission configuration item B, and the transmission configuration items C and D with different configuration values may be combined with the first control information to determine different data channels. Therefore, even if the terminal correctly detects and receives the first control information to obtain the configuration value A1 for the transmission configuration item A and the configuration value B1 for the transmission configuration item B, the terminal still cannot obtain the data channel for performing the data transmission with the base station.

In this embodiment, the first control information may include a presence indication used for indicating whether second control information exists. The second control information may indicate the configuration value of the transmission configuration item, which is not indicated in the first control information, that is, indicate the remaining part of the transmission configuration of the data channel. Therefore, the first control information and the second control information may jointly indicate one piece of data information. After the terminal receives the first control information, if it is determined through analysis that the first control information includes the presence indication, it indicates that the base station has sent the second control information; otherwise, it indicates that the base station does not send the second control information, that is, the second control information does not exist.

In some examples of this embodiment, the second control information may include at least one of several types of information, such as precoding matrix indicator (PMI) information, a number of transmission layers, modulation and coding scheme (MCS) information, and a transmission beam.

In S104, when second control information is not obtained from the base station, a transmission configuration parameter of a data channel is determined according to the first control information and preset control information.

In conjunction with the aforementioned description, it can be seen that the case where the terminal does not obtain the second control information from the base station may be either one of two cases described below.

In a first case, the base station itself does not send the second control information, for example, the first control information does not include the presence indication, so it is impossible for the terminal to receive and obtain the second control information from the base station side.

In a second case, the base station has sent the second control information, and the first control information includes the presence indication of the second control information, but the terminal does not correctly detect the second control information, so the terminal also fails to obtain the second control information from the base station.

In some examples of this embodiment, the terminal needs to determine whether the second control information exists according to the first control information, so even if the base station has sent the first control information and the second control information, the terminal will still receive the first control information first, and then receives the second control information according to the indication of the first control information. Therefore, a time sequence may exist in the process of receiving the first control information and the second control information, or it may be said that the receiving result of the first control information will affect the receiving process of the second control information: if the first control information cannot be correctly received by the terminal, it is basically impossible for the terminal to correctly receive the second control information. It can be seen that, it is very important to ensure that the first control information transmitted on the first control channel is correctly received.

In one example of this embodiment, the transmission configuration of the first control information for transmitting the first control information is generally better than the transmission configuration of the second control channel for transmitting the second control information. The first control channel has better parameters such as the BLER and a better overall robustness than the second control channel.

In the case where the terminal fails to obtain the second control information from the base station side, in a traditional transmission scheme, the terminal cannot continue the data transmission with the base station, but in this embodiment, the terminal pre-stores the preset control information, and the preset control information may indicate other transmission configuration items, which are not indicated in the first control information. Therefore, the preset control information and the first control information may jointly determine the data channel. For example, the first control information indicates the configuration values of the transmission configuration items A and B of the data channel, and the preset control information may indicate the configuration values of the remaining transmission configuration items C and D. Assuming that the preset control information indicates C1 and D1 respectively for the transmission configuration items C and D, the terminal may determine a data channel according to A1, B1, C1 and D1, so as to continue the data transmission with the base station.

In this embodiment, the preset control information may include at least one of first preset control information or second preset control information. The first preset control information is determined by a pre-agreement between the terminal and the base station, for example, a corresponding manager inputs and sets the first preset control information on the terminal side and the base station side. The second preset control information may be configured and generated by the base station and then transmitted to the terminal through a higher layer. The higher layer here refers to a layer above a physical layer, for example, a layer above the physical layer in an open system interconnect (OSI) reference model or a transmission control protocol/Internet protocol (TCP/IP) five-layer model.

When the preset control information merely includes the first preset control information, the terminal may determine the data channel according to the first control information and the first preset control information; when the preset control information merely includes the second preset control information, the terminal may determine the data channel according to the first control information and the second preset control information. When the preset control information includes both the first preset control information and the second preset control information, the terminal may randomly select one of the first preset control information or the second preset control information to combine with the first control information for determining the data channel. In some examples of this embodiment, when the preset control information includes both the first preset control information and the second preset control information, the terminal may select, according to whether the first control information includes the presence indication, one for determining the data channel. For example, when the presence indication is not included in the first control information, the terminal selects the first preset control information to determine the data channel collectively with the first control information, and when the presence indication is included in the first control information, the terminal selects the second preset control information to determine the data channel collectively with the first control information. Compared with the aforementioned method of randomly selecting either of the two to determine the data channel, this scheme of selecting different preset control information according to different situations avoids multiple attempts and is conducive to improving the efficiency of the data transmission between two ends, since this selection method has a principle and when the base station also knows the principle, the base station can have a greater chance to know which data channel should be selected before the data transmission is performed, so as to cooperate with the terminal to achieve a data transmission.

In some examples of this embodiment, in different data transmission processes, transmitted data services have different characteristics, so the first control information has different characteristics, for example, the content included in the first control information is different. In this case, the content in the preset control information used for cooperating with the first control information will also be different. To avoid individually agreeing or transmitting the preset control information for each data transmission configuration, in some examples of this embodiment, the terminal side may pre-store one piece of unified control information, and the unified control information may include many transmission configuration items for indicating the transmission configuration of the data channel or even all transmission configuration items. For example, in one example of this embodiment, the unified control information pre-stored on the terminal side includes configuration values A1, B1, C1, and D1 respectively for four transmission configuration items A, B, C, and D. When the terminal obtains merely the first control information from the base station, according to the transmission configuration items already included in the first control information, the transmission configuration items not included in the first control information may be selectively extracted from the unified control information to constitute the preset control information. For example, when the first control information includes A2 and C5, the terminal may extract B1 and D1 to constitute the preset control information. When the first control information includes A1 and D3, the terminal may extract B1 and C1 to constitute the preset control information.

It can be understood that when the second control information exists, the transmission configuration of the data channel determined jointly by the first control information and the second control information may be different from or the same as the transmission configuration of the data channel determined by the first control information and the set of the preset control information. In other words, the configuration value of a transmission configuration item in the second control information may be different from or the same as the configuration value of the corresponding transmission configuration item in the preset control information.

In S106, a data transmission is performed according to the transmission configuration parameter of the data channel.

After the terminal determines the data channel according to the first control information and the preset control information, the data channel may be used for performing the data transmission with the base station. In the case where the base station does not send the second control information, the terminal may determine, according to the first control information, whether the base station has sent the second control information, and meanwhile, the base station naturally knows that itself has not sent the second control information, so the base station and the terminal may directly perform the data transmission according to the data channel determined by the first control information and the preset control information. Moreover, if the terminal and the base station have pre-agreed to select which preset control information to determine the data channel when the second control information does not exist, the terminal and the base station may directly determine a same data channel to complete the data transmission, thus avoiding the occurrence of a data transmission failure caused by an inconsistent selection of the preset control information between the terminal and the base station.

It should be understood that the aforementioned "data transmission" includes an uplink data transmission and a downlink data transmission. In the case where the base station has sent the second control information, if the terminal serves as a data sending end, the terminal may send data to the base station according to the data channel determined by the preset control information and the first control information. The base station may also use the preset control information and the first control information to determine the data channel, thus receiving the data sent by the terminal. Of course, the base station may assume in advance that the terminal has received the second control information, and the base station determines the data channel according to the first control information and the second control information first to receive the data. If the data fails to be received, the base station may determine the data channel according to the first control information and the preset control information to receive the data. Of course, the base station may first determine the data channel according to the first control information and the preset control information to receive the data, and after the data fails to be received, receives the data on the data channel determined by the first control information and the second control information.

If the terminal is served as a data receiving end, the terminal may first feed back a receiving situation of the control information at the terminal to the base station. Then, the base station sends data according to the feedback message, or the base station sends data on the data channel determined by the first control information and the second control information, and on the other hand, the base station also sends the data on the data channel determined by the first control information and the preset control information, so that the terminal can always receive the data through one of the data channels determined above.

According to the transmission method provided by this embodiment of the present disclosure, when the terminal cannot obtain the second control information for indicating a part of the transmission configuration of the data channel from the base station side, the data channel can be jointly determined according to the predetermined preset control information and the first control information, and the data transmission with the base station can be continued based on the data channel, thus avoiding the situation that the data transmission process is forced to be delayed since the second control information cannot be obtained, improving the data transmission efficiency, which also avoids the terminal service being affected, and ensures the user experience on the terminal side.

Embodiment Two

Figure 2:
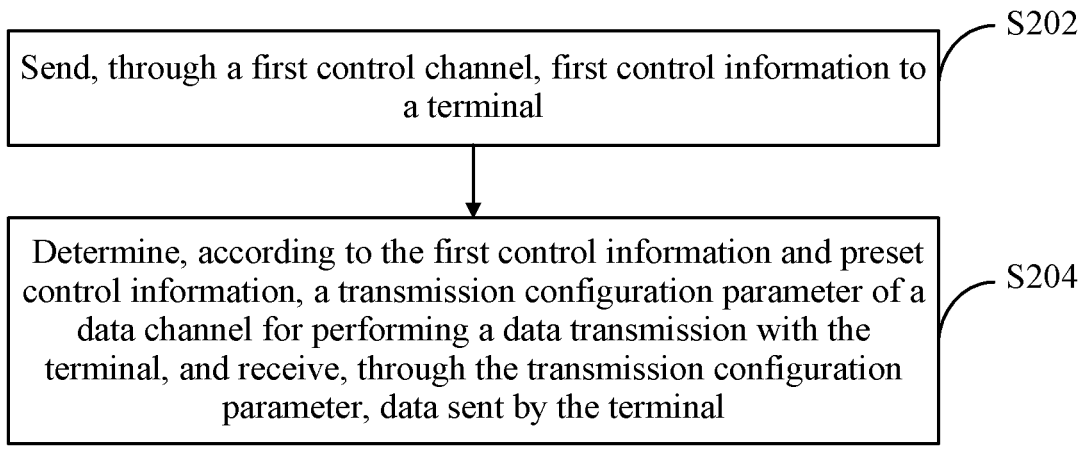
FIG. 2 is a flowchart of an uplink receiving method according to an embodiment two of the present disclosure.

This embodiment provides an uplink receiving method. The uplink receiving method may be applied to a base station and is used for receiving data sent by a terminal after the base station sends control information to the terminal to indicate the terminal to send the data. A flowchart of the uplink receiving method shown in FIG. 2 can be seen.

In S202, first control information is sent to a terminal through a first control channel.

The base station sends the first control information to the terminal through the first control channel, and the first control information may indicate a part of the transmission configuration of a data channel. The other part of the transmission configuration of the data channel may be indicated by other control information. In this embodiment, the base station may send second control information for indicating the remaining part of the transmission configuration of the data channel to the terminal, or may not send the second control information to the terminal. In the case where the base station has sent the second control information, the base station may uses the first control information to carry a presence indication, and indicates, through the presence indication, to the terminal that the second control information exists since the base station itself has sent the second control information. In addition, in some examples of this embodiment, the first control information sent by the base station may also indicate a second control channel for carrying the second control information, so that the terminal detects and receives the second control information on the corresponding second control channel when determining that the second control information exists. If the base station does not send the second control information, the presence indication does not need to be carried in the first control information. In this case, when the terminal receives the first control information, it may be determined that the base station does not send the second control information, so the second control information does not exist. In S204, a transmission configuration parameter of a data channel for performing a data transmission with the terminal is determined according to the first control information and preset control information, and data sent by the terminal is received through the transmission configuration parameter.

After the base station sends the first control information to the terminal, the base station may use the first control information and pre-stored preset control information to determine a data channel, so as to receive the data sent by the terminal. Of course, the data sent by the terminal may be received on such data channel only when the terminal fails to obtain the second control information from the base station. The reason is that normally, if the terminal obtains the second control information from the base station side, the terminal will combine the first control information and the second control information to determine a data channel and send the data to the base station by using this data channel.

Two cases may be included in which the terminal cannot obtain the second control information from the base station side, which have been described in the embodiment one. These two cases are mainly the case in which the base station itself does not send the second control information and the case in which the base station has sent the second control information but the terminal side fails to successfully receive the second control information.

Thus, in some examples of this embodiment, the base station may determine the data channel merely according to the joint indication of the first control information and the preset control information. For example, in the case where the base station does not send the second control information, the terminal must use the first control information and the preset control information to determine the data channel, since it is impossible for the terminal side to receive the second control information anyway in this case.

In other examples of this embodiment, the base station may determine the data channel between the base station and the terminal by using the first control information and the preset control information, or may also determine a data channel according to the indication of the first control information and the second control information. This scheme is applicable to the case where the base station has sent the second control information, i.e., the first control information carries the presence indication, since the terminal is likely to receive the second control information in this case. In some examples, the base station may combine the above two methods when determining the data channel.

For example, the base station determines one data channel (assuming a data channel M) by using the first control information and the second control information, and also determines one data channel (assuming a data channel N) by using the first control information and the preset control channel, and data receiving is performed on both the data channel M and data channel N at the same time. Alternatively, the base station uses one of the data information to receive the data, and when a data receiving result cannot pass the check, then uses the other data channel to receive the data. For example, the base station has sent the second control information, so, in an exemplary embodiment, the base station may use the first control information and the second control information to jointly determine the data channel, which, however, requires the terminal side to have a relatively high success rate of receiving the second control information, for example, at least more than 50%, since only in this case will the possibility of the terminal using the second control information to determine the data channel be greater than the possibility of using the preset control information to determine the data channel. On the contrary, if the success rate of receiving the second control information on the terminal side is relatively low, for example, less than 50%, the terminal is more likely to determine the data channel by using the first control information and the preset control information. Therefore, the base station may make statistics on the situation of the terminal side receiving the second control information, so as to determine which method is selected first to determine the data channel, thus avoiding the situation of a data receiving failure and waste of transmission time and transmission resources since mismatched control information is selected.

As has been described in the embodiment one, the preset control information includes at least one of the first preset control information or the second preset control information. In this embodiment, the preset control information used by the base station side is the same as the preset control information used by the terminal side. Therefore, the preset control information in this embodiment also includes the first preset control information and/or the second preset control information. In this embodiment, the first control channel and the second control channel respectively used for transmitting the first control information and the second control information are both physical layer channels, while the preset control information is usually transmitted by the base station to the terminal not through a physical layer. Therefore, the terminal may acquire the preset control information in a manner other than the manner of acquiring the second control information.

When the preset control information merely includes the first preset control information, the base station may determine the data channel according to the first control information and the first preset control information; when the preset control information merely includes the second preset control information, the base station may determine the data channel according to the first control information and the second preset control information. When the preset control information includes both the first preset control information and the second preset control information, the base station can randomly select one of the first preset control information or the second preset control information to combine with the first control information for determining the data channel. In some examples of this embodiment, when the preset control information includes both the first preset control information and the second preset control information, the base station may select, according to whether the base station itself has sent the second control information, one of them to determine the data channel. For example, when the second control information is not sent, the base station selects the first preset control information to determine the data channel collectively with the first control information, and when the second control information has been sent, the base station selects the second preset control information to determine the data channel collectively with the first control information. Compared with the aforementioned method of randomly selecting either one of these two to determine the data channel, this scheme of selecting different preset control information according to different situations avoids multiple attempts and is conducive to improving the efficiency of a data transmission between two ends since this selection method has a principle and when the terminal also knows the principle, the terminal can have a greater chance to know which data channel should be selected before the data transmission is performed, so as to cooperate with the base station to achieve the data transmission.

It should be understood that in a transmission data transmission scheme, it is also possible for the base station to send merely one piece of the control information to the terminal to indicate the terminal to perform the data transmission, which, however, is not the same as the scheme in this embodiment in which the base station merely sends the first control information and does not send the second control information for a following reason: in the traditional data transmission scheme, when the base station sends merely one piece of the control information to the terminal, the scheme belongs to a single-level control information transmission scheme, so all transmission configuration items for determining the data channel should be included in the transmission information. However, in this embodiment, not all the transmission configuration items that may determine one data channel are included in the first control information.

According to the uplink receiving method provided in this embodiment, after sending the first control information for indicating the data channel to the terminal, the base station can jointly determine the data channel according to the first control information and the predetermined preset control information, and performs the data transmission with the terminal based on the data channel, thus avoiding effects on the data transmission efficiency, the system throughput, and the user experience of the terminal side due to the fact that when the terminal cannot obtain the second control information, the data transmission between two ends cannot be performed and the transmission process is stalled.

Embodiment Three

Figure 3:
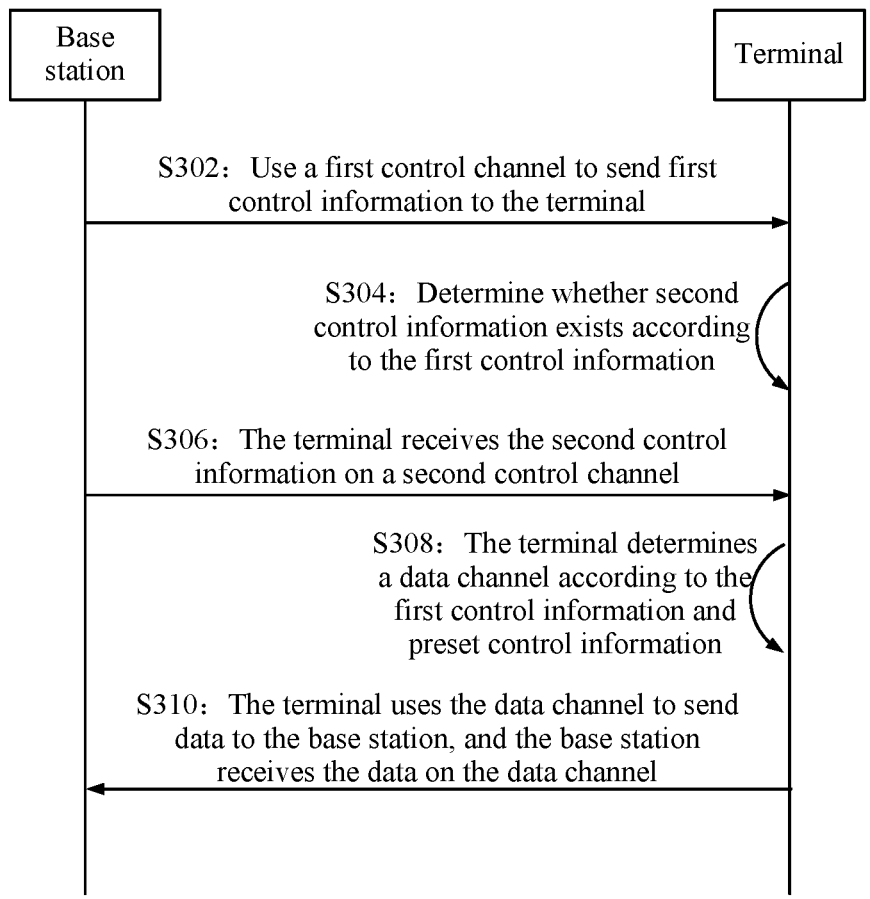
FIG. 3 is an interactive diagram of a data transmission between a base station and a terminal according to an embodiment three of the present disclosure.

This embodiment will describe the scheme of a data transmission between a base station and a terminal in conjunction with examples, so as to further explain the transmission method and the uplink receiving method described in the aforementioned embodiments, to make the advantages and details of the embodiments of the present disclosure clearer to those skilled in the art. FIG. 3 can be seen.

It is assumed that configuration values of six transmission configuration items A, B, C, D, E, and F are required for determining one data channel. The base station now needs to schedule the terminal to perform an uplink data transmission by sending control information to the terminal. The base station has sent first control information and second control information. The first control information includes a configuration value A3 of the transmission configuration item A and a configuration value B3 of the transmission configuration item B.

In S302, the base station uses the first control channel to send the first control information to the terminal, and uses the second control channel to send the second control information.

In this embodiment, since the base station has sent the second control information to the terminal side, a presence indication is included in the first control information. In addition, the first control information may also include the configuration values A3 and B3 of a part of the transmission configuration items of the data channel, information for indicating the resource position of the second control channel, and the like. The second control information may include one or more of the PMI information, the number of transmission layers, the MCS information, or the transmission beam.

In S304, whether the second control information exists is determined according to the first control information.

After the terminal receives the first control information through the first control channel, the presence of the second control information may be determined according to the presence indication carried in the first control information, so the terminal may proceed to S306 to receive the second control information on the corresponding second control channel. In other examples of this embodiment, if no presence indication of the second control information is carried in the first control information, the terminal may directly perform S308.

In S306, the terminal receives the second control information on the second control channel.

In this embodiment, it is assumed that when the terminal receives the second control information on the second control channel, the receiving fails.

In S308, the terminal determines a data channel according to the first control information and preset control information.

Since the terminal fails to receive the second control information, the terminal may determine the data channel merely according to the predetermined preset control information and the first control information. The preset control information here is equivalent to replacement information of the second control information.

It is assumed that the terminal and the base station pre-agree that if the base station has sent the second control information but the terminal fails to receive the second control information, second preset control information and the first control information are used to determine the data channel, and that if the base station does not send the second control information, first preset control information and the first control information are used to determine the data channel. Therefore, after the terminal fails to receive the second control information, the terminal may use the second preset control information and the first control information to determine the data channel. In this embodiment, the second preset control information should include configuration values of the transmission configuration items C, D, E and F, for example, configuration values C2, D2, E6 and F1. Therefore, the terminal may determine one data channel according to A3, B3, C2, D2, E6 and F1 finally.

It should be understood that if the terminal receives the second control information sent by the base station, the terminal may directly determine the data channel according to the first control information and the second control information.

In S310, the terminal uses the data channel to send data to the base station, and the base station receives the data on the data channel.

After determining the data channel, the terminal may use the data channel to send the data to the base station. Correspondingly, the base station may also determine the same data channel according to the first control information and the second preset control information, and receive the data on this data channel. It should be understood that in this embodiment, the base station itself has sent the second control information to the terminal, and when the base station does not obtain feedback information from the terminal side, generally, it is not possible to accurately know whether the first control information and the second control information are used to determine the data channel or the first control information and the preset control information are used to determine the data channel, so the base station may first receive data on the data channel determined by the first control information and the second control information. Then a check on a data receiving result is performed, if the check on the data receiving result fails, the first control information and the second preset control information are used (since the base station and the terminal have pre-agreed that if the base station has sent the second control information but the terminal fails to receive the second control information, the second preset control information and the first control information are used to determine the data channel, and therefore here, the base station uses the second preset control information and the first control information to determine the data channel) to determine the data channel to receive data. Alternatively, the base station first receives the data by using the data channel determined by the first control information and the second preset control information, and after the check on a data receiving result fails, receives the data by using the transmission configuration parameter of the data channel determined by the first control information and the second preset control information. Of course, the base station may also receive the data by using the transmission configuration parameter determined by the first control information and the second preset control information while receiving the data by using the transmission configuration parameter determined by the first control information and the preset control information. In this way, the base station can correctly receive data in shortest time, improving the data receiving efficiency.

According to the data transmission scheme provided by this embodiment, the terminal and the base station make a pre-agreement or the base station sends the preset control information to the terminal side through a layer higher than the physical layer. In this way, when the terminal cannot obtain the second control information for indicating a part of the transmission configuration of the data channel from the base station side, the preset control information and the first control information can be used to jointly determine one data channel and data continues to be sent to the base station side, thus avoiding that the data transmission service is delayed, the transmission efficiency is affected and the user experience is reduced.

Embodiment Four

Figure 4:
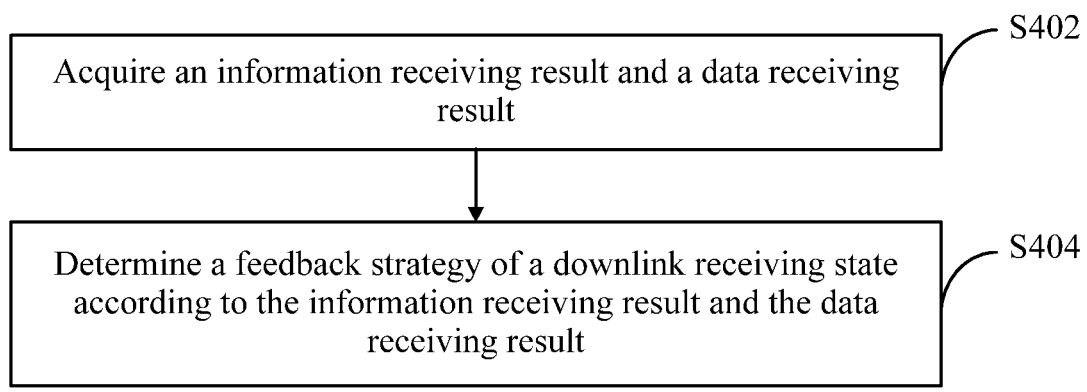
FIG. 4 is a flowchart of a feedback strategy determination method according to an embodiment four of the present disclosure.

This embodiment provides a feedback strategy determination method for the situation that a sending end cannot know the receiving situation of control information and data at a receiving end when the sending end sends one piece of first control information and two pieces of second control information to the receiving end to indicate the receiving end to receive data. Since it is usually a base station which sends the control information to indicate the receiving end to receive data, a case of the base station being the sending end and a terminal being the receiving end is described in this embodiment. Therefore, the feedback strategy determination method provided by this embodiment is generally applicable to the terminal. See FIG. 4.

In S402, an information receiving result and a data receiving result are acquired.

In this embodiment, the information receiving result refers to a result of the terminal receiving the control information sent by the base station. In some examples, the base station sends first control information to the terminal through a first channel and second control information to the terminal through a second channel, so the information receiving result correspondingly includes a second information receiving result of the second control information and a first information receiving result of the first control information. The first control information belongs to first-level control information and may include an indication of whether second-level control information exists, and information indicating a number of pieces of the second-level control information when the second-level control information exists. The second control information belongs to the second-level control information. The first control information and the second control information may jointly indicate or collectively indicate the transmission configuration of a first transport block.

In some examples, the base station will also send third control information to the terminal through a third channel. The third control information is similar to the second control information and also belongs to the second-level control information. Therefore, the first control information includes a presence indication for representing the presence of the second-level control information and indicating the presence of two pieces of the second-level control information. The first control information and the second control information may be used for collectively indicating the transmission configuration of the first transport block, and the first control information and the third control information collectively indicate the transmission configuration of a second transport block. It should be understood that the first transport block and the second transport block may be different transport blocks belonging to different data channels, or may be different transport blocks belonging to a same data channel. Therefore, in these examples, the information receiving result includes a first information receiving result for the first control information, a second information receiving result for the second control information, and a third information receiving result for the third control information.

In this embodiment, the first channel, the second channel and the third channel may be control channels or data channels. In some examples of this embodiment, the first channel is a control channel, and the second channel and the third channel may be data channels.

The data receiving result in this embodiment refers to a result of the terminal detecting and receiving the data sent by the base station. If the control information sent by the base station merely includes the first control information and the second control information, i.e., merely the first transport block exists, the data receiving result is a first data receiving result of the terminal receiving the data transmitted on the first transport block. If the control information sent by the base station further includes the third control information, the data receiving result includes the first data receiving result of the terminal receiving the data transmitted on the first transport block and a second data receiving result of the terminal receiving the data transmitted on the second transport block.

In this embodiment, the receiving results of the terminal receiving the first control information, the second control information and the third control information are collectively referred to as the information receiving result. The information receiving result includes the first information receiving result for the first control information, the second information receiving result for the second control information, and the third information receiving result for the third control information. The receiving results of the terminal receiving the data on the first transport block and the data on the second transport block are collectively referred to as the data receiving result. The data receiving result includes the first data receiving result corresponding to the first transport block and the second data receiving result corresponding to the second transport block. It should be understood that the information receiving result will affect the data receiving result to some extent. If the second information receiving result in the information receiving result is a failure, the terminal cannot determine the transmission configuration for the first transport block according to the first control information and the second control information, so the first data receiving result naturally cannot be a success. Therefore, when the terminal acquires the information receiving result and the data receiving result, it does not necessarily require the terminal to completely perform the receiving of control information and the receiving of data. Similarly, the first control information generally includes the presence indication used for indicating whether the second-level control information exists, and may also include information for indicating data of the second-level control information, therefore, if the first information receiving result corresponding to the first control information is a failure, the terminal is almost unlikely to receive the second control information and the third control information, and even less likely to receive data from both the first transport block and the second transport block. Therefore, the feedback strategy determination method provided in this embodiment is based on a case where the first control information is successfully received, that is, it is assumed that the first information receiving result is always a success.

In S404, a feedback strategy of a downlink receiving state is determined according to the information receiving result and the data receiving result.

When the terminal obtains the information receiving result and the data receiving result, the terminal may determine the feedback strategy of the downlink receiving state according to the information receiving result and the data receiving result. In this embodiment, the feedback strategy determined by the terminal may be to send information to the base station for feedback or may be not to send information to the base station for feedback, since sending information and not sending information belong to different feedback states, and the base station may also determine the receiving state of the terminal according to no feedback information sent by the terminal.

Several modes in which the terminal determines the indication information for feedback when the base station merely sends the first control information and the second control information are described below.

A mode one: the indication information includes a first control indication, a second control indication and a data receiving indication, the first control indication is determined according to the receiving result of the first control information, the second control indication is determined according to the receiving result of the second control information, and the data receiving indication is determined according to the receiving result of the data on the first transport block. In short, the mode one is to independently provide feedback for the first control information, the second control information and the data receiving result. Of course, independent feedback here does not refer to that feedback for each receiving result is sent as an independent message and merely indicates that the indication information for feedback includes identification information respectively for indicating each receiving situation. Therefore, one, two or three pieces of indication information may be provided.

For example, assuming that "0" is served as a success identifier and "1" is served as a failure identifier, if the terminal correctly receives the first control information and the second control information, the first control indication is "0" in the indication information for feedback; and if the second control information fails to be received, the second control indication is "1". Of course, in this case, the data receiving result of the terminal is also a failure, so the data receiving indication is also "1". It should be understood that in this example, "0" is served as the success identifier and "1" is served as the failure identifier for the receiving result of the first control information, the receiving result of the second control information and the data receiving result. However, in some examples of this embodiment, the success identifiers and failure identifiers of the receiving result of the first control information, the receiving result of the second control information and the data receiving result are different. For example, "0" and "1" are respectively served as the success identifier and the failure identifier for the receiving result of the first control information, "a" and "b" are respectively served as the success identifier and the failure identifier for the receiving result of the second control information, and "m" and "n" are respectively served as the success identifier and the failure identifier for the data receiving result. In this case, even if the receiving result of the first control information is a success and the receiving result of the second control information and the data receiving result are each a failure, the content of the indication information is different from the content in the previous example, in this example, the indication information includes three identifiers of "0", "b" and "n".

A mode two: the indication information includes a control indication and a data receiving indication, the control indication is determined according to the information receiving result, and the data receiving indication is determined according to the data receiving result.

In this feedback mode, the terminal indicates the receiving results of the first control information and the second control information to the base station through the control indication. If the receiving result of the first control information and the receiving result of the second control information are each a success, that is, the information receiving result is a success, the control indication includes a success identifier; otherwise, the control indication may include a failure identifier, or no feedback may be performed. That is, as long as one of the receiving result of the first control information or the receiving result of the second control information is a failure, the control indication in the indication information does not include the success identifier. The data receiving indication is determined according to the data receiving result. If the data transmitted on the first transport block is successfully received, the data receiving indication includes a success identifier; if the data transmitted on the first transport block is not successfully received, a failure identifier is included.

A mode three: the indication information includes a first control indication and an information data indication, the first control indication is determined according to the receiving result of the first control information, and the information data indication is determined according to the receiving result of the second control information and the data receiving result.

In this scheme of determining feedback, the terminal will independently feed back the receiving result of the first control information, so that the base station may clearly know the receiving situation of the first control information by the terminal, and the terminal feeds back the receiving situation of the second control information and the receiving situation of the data on the first transport block to the base station as a whole. For example, when the receiving result of the first control information is a failure, the first control indication includes a failure identifier; when the receiving result of the first control information is a success, the first control indication includes a success identifier. Since the receiving situation of the second control information and the receiving situation of the data are jointly fed back, only when the data receiving result is a success will the information data indication sent by the terminal include a success identifier; otherwise, the success identifier will not be included. This means that only when the terminal successfully receives the second control information and the data receiving result is also a success will the terminal feed back the information data indication including the success identifier to the base station.

When the base station merely sends the first control information and the second control information, the terminal may decide, according to feature information about the second control information, to use in following two manners to determine which of the above three modes is adopted to determine the feedback strategy. Alternatively, the terminal first acquires the feature information about the second control information, and then determines the selected mode according to the feature information. The feature information here includes an information content and/or a transmission channel type.

In some examples of this embodiment, the terminal may decide how to determine the feedback strategy according to an indication from the base station. For example, the base station may send feedback mode indication information to the terminal, and when the terminal receives the feedback mode indication information, the feedback mode designated by the base station may be determined according to the feedback mode indication information, and then the feedback strategy is determined according to the feedback mode.

A scheme in which the terminal determines the feedback strategy when the base station sends the first control information, the second control information and the third control information is described below. Two feedback principles are described first.

A feedback principle one: the terminal feeds back a downlink receiving state corresponding to the first transport block and a downlink receiving state corresponding to the second transport block to the base station through one uplink control channel resource.

Under this feedback principle, the base station merely allocates one uplink control channel resource for the terminal to feed back the downlink receiving states corresponding to the two transport blocks. For example, an uplink control channel resource, a physical uplink control channel (PUCCH) resource allocated by the base station is used for feedback. Therefore, the terminal needs to feed back information that may reflect receiving results of the first control information and the second control information and the data receiving result of the first transport block, and the information reflecting the receiving results of the first control information and the third control information and the data receiving result of the second transport block is fed back to the base station through the uplink control channel resource.

It should be understood that the information receiving results and the data receiving results respectively corresponding to the two transport blocks need to be fed back to the base station through a same resource, so under this feedback principle, the situation, in which merely the information receiving result and the data receiving result corresponding to one transport block are fed back but the information receiving result and the data receiving result corresponding to the other transport block are not fed back, cannot occur.

A feedback principle two: the terminal feeds back, through a first uplink control channel resource corresponding to the first transport block, the downlink receiving state corresponding to the first transport block to the base station, and feeds back, through a second uplink control channel resource corresponding to the second transport block, the downlink receiving state corresponding to the second transport block to the base station.

Under this feedback principle, each piece of the second-level control information corresponds to one uplink control channel resource. In other words, each transport block corresponds to one uplink control channel resource. Therefore, when the downlink receiving state corresponding to each transport block is fed back, the adopted resource is independent, and the situation, in which feedback is performed on the downlink receiving state corresponding to one transport block and no feedback is performed on the downlink receiving state corresponding to the other transport block, may occur.

Two feedback principles are provided in this embodiment, so when the terminal determines the feedback strategy for downlink receiving, the terminal may determine a corresponding feedback strategy based on either one of the feedback principles. Therefore, the terminal may determine, based on using the feedback principle one, the feedback strategy of the downlink receiving state according to the information receiving result and the data receiving result, or determine, based on using the feedback principle two, the feedback strategy of the downlink receiving state according to the information receiving result and the data receiving result.

In some examples of this embodiment, the terminal may determine, according to the feature information about the second-level control information, whether to adopt the feedback principle one or the feedback principle two to determine the feedback strategy. In this embodiment, the second-level control information includes the second control information and the third control information, so the terminal may make a selection according to the feature information about either the second control information or the third control information, alternatively, based on at least one of the information content or the transmission channel type of the second control information/third control information. For example, if the second control information and the third control information are transmitted in a physical downlink shared channel (PDSCH) region, the terminal may select to determine the feedback strategy according to the feedback principle two; if the second control information and the third control information are transmitted in a control resource set (CORESET) region, the terminal may select to determine the feedback strategy according to the feedback principle one. In short, when the base station performs a division transmission on the control information, different dividing principles, transmission modes and other factors will affect the selection of the feedback principle by the terminal. In the above example, the scheme in which the terminal decides the feedback principle according to the feature information about the first control information and/or the feature information about the second control information is described. In some examples of this embodiment, the base station may indicate the selection of the feedback principle to the terminal through feedback principle indication information, so that when the terminal receives the feedback principle indication information sent by the base station, the terminal may select the corresponding one from the feedback principle one and the feedback principle two, and then determine the corresponding feedback strategy according to the feedback principle.

The scheme of the terminal selecting to use the feedback principle one to determine the feedback strategy is described below.

Scheme One

The terminal may determine indication information fed back to the base station through the uplink control channel resource, and the indication information is used for representing downlink receiving states corresponding to the first transport block and the second transport block. In this embodiment, since the downlink receiving states corresponding to the two transport blocks need to be fed back, two identification bits are included in the indication information, one identification bit corresponds to the first transport block and the other identification bit corresponds to the second transport block.

If the control information corresponding to a transport block is not successfully received, it is to be noted that in scheme one, the data receiving result corresponding to the transport block will definitely fail if the second-level control information corresponding to the transport block is not successfully received. In this embodiment, if data on a transport block is successfully received, the indication information includes a success identifier; otherwise, the indication information includes a failure identifier. That is, in this scheme, there is no distinction between a case where the final data receiving failure is caused by the receiving failure of the second-level control information and a case where the data receiving fails while the receiving of both the first control information and the second-level control information succeeds. As long as the data receiving fails, the result is uniformly regarded as a failure.

In this embodiment, it is assumed that "0" is served as a success flag, "1" is served as a failure flag, and the indication information includes information of two flags "XY", where X corresponds to the first transport block and Y corresponds to the second transport block. Then, the indication information is "11" in a case where the first information receiving result is a success, the second information receiving result is a failure, the third receiving result is a success, the first data receiving result is a failure, and the second data receiving result is also a failure.

Scheme Two

The correspondence between a state combination and indication information is pre-stored in the terminal. For example, indication information "000" corresponds to a state combination in which the receiving result of each information is a success and the receiving result of each data is also a success; and indication information "001" corresponds to a state combination in which the receiving result of each information is a success, the first data receiving result in the data receiving result is a success and the second data receiving result in the data receiving result is a failure, and so on. Therefore, in scheme two, the terminal may first determine the state combination of the first information receiving result, second information receiving result, third information receiving result, first data receiving result and second data receiving result, which are all in current downlink receiving; and then, the terminal determines target indication information matching the state combination of the current downlink receiving according to the correspondence.

Generally, when one uplink control channel resource is used to feed back the downlink receiving states corresponding to the two transport blocks to the base station, the terminal will merely use 2 bits, but in this embodiment, even if the first receiving result corresponding to the first control information is assumed to be a success, there are still 9 cases. Referring to table 1, it shows various state combinations.

TABLE 1

| Case type | | First information receiving result | Second information receiving result | Third information receiving result | First data receiving result | Second data receiving result |
|---|---|---|---|---|---|---|
| Case A | A1 | Y | Y | Y | Y | Y |
|  | A2 | Y | Y | Y | Y | N |
|  | A3 | Y | Y | Y | N | Y |
|  | A4 | Y | Y | Y | N | N |
| Case B | B1 | Y | N | Y | — | Y |
|  | B2 | Y | N | Y | — | N |
| Case C | C1 | Y | Y | N | Y | — |
|  | C2 | Y | Y | N | N | — |
| Case D | \ | Y | N | N | — | — |

"Y" represents a corresponding receiving result being a success, "N" represents a corresponding receiving result being a failure, and "-" represents that the terminal has not tried to perform receiving and demodulation on data when the second-level control information corresponding to a transport block fails to be received. Of course, "-" may be regarded as a case of a failure of the receiving result, and may also be replaced by "N".

Therefore, to make these 9 states shown in table 1 each have corresponding indication information, in this embodiment, 3 bits may be used for the indication information, the 3 binary bits may represent 8 cases, and the 8 cases plus a case in which the terminal does not provide feedback to the base station may represent the 9 cases in total.

It should be understood that in the aforementioned description, "000" corresponds to the state in which the information receiving result and the data receiving result are each a success, and "001" corresponds to the state in which the receiving result of each information is a success, the first data receiving result in the data receiving result is a success and the second data receiving result in the data receiving result is a failure, and so on. In other examples of this embodiment, other indication information may also be used to correspond to these states, as long as one type of indication information corresponds to one type of downlink receiving state.

The scheme of the terminal selecting to use the feedback principle two to determine the feedback strategy is described below.

Scheme Three

In scheme three, the terminal feeds back, through the first uplink control channel resource, indication information for representing the downlink receiving state corresponding to the first transport block to the base station, and determines to feed back, through the second uplink control channel resource, indication information for representing the downlink receiving state corresponding to the second transport block to the base station. If data on a transport block is successfully received, the indication information corresponding to the transport block includes a success identifier; if data on a transport block cannot be successfully received, the indication information corresponding to the transport block includes a failure identifier.

Similar to the scheme one, the terminal in this scheme does not distinguish between the case where the final data receiving failure is caused by the receiving failure of the second-level control information and the case where the data receiving fails while the receiving of both the first control information and the second-level control information succeeds, and as long as the data receiving fails, the result is uniformly regarded as a failure. In the scheme one, 2 bits will be used to carry two pieces of identification information respectively corresponding to the first transport block and the second transport block, and different from the scheme one, in this embodiment, only 1 bit will be used to carry identification information corresponding to one transport block in one piece of indication information. For example, assuming that the first data receiving result corresponding to the first transport block is a failure, the failure identifier is carried in the indication information sent on the first uplink control channel resource. Assuming that the second data receiving result corresponding to the second transport block is a success, the success identifier is carried in the indication information sent on the second uplink control channel resource.

Scheme Four

In this scheme, if the data receiving result corresponding to a transport block finally fails due to the fact that the second-level control information corresponding to the transport block fails to be received, the terminal considers that the receiving of the control information fails, therefore, in conjunction with a traditional feedback strategy (in the traditional feedback strategy, if the control information is not received, the terminal does not provide feedback to the base station, and if the control information is successfully received but the data receiving result is a failure, the terminal feeds back a negative acknowledgement (NACK) message to the base station; if the control information is successfully received and the data receiving result is a success, the terminal feeds back acknowledgement (ACK) information to the base station), when the control information is not successfully received, no feedback is provided to the base station.

Therefore, in this embodiment, for a certain transport block, if the second information receiving result corresponding to this transport block is a failure, the terminal determines not to feed back the downlink receiving state corresponding to the transport block to the base station; otherwise, only when the data receiving result corresponding to the transport block is also a success will the terminal determine to feed back the indication information including the success identifier to the base station through the corresponding uplink control channel resource, or when the data receiving result corresponding to the transport block is a failure, the terminal will determine to feed back the indication information including the failure identifier to the base station through the corresponding uplink control channel resource.

For example, when the second information receiving result is a failure, the terminal determines not to feed back the downlink receiving state corresponding to the first transport block to the base station; otherwise, when the first data receiving result is a success, the terminal determines to feed back the indication information including the success identifier to the base station through the first uplink control channel resource; or when the first data receiving result is a failure, the terminal determines to feed back the indication information including the failure identifier to the base station through the first uplink control channel resource.

When the third information receiving result is a failure, the terminal determines not to feed back the downlink receiving state corresponding to the second transport block to the base station; otherwise, when the second data receiving result is a success, the terminal determines to feed back the indication information including the success identifier to the base station through the second uplink control channel resource, or when the second data receiving result is a failure, the terminal determines to feed back the indication information including the failure identifier to the base station through the second uplink control channel resource.

According to the feedback strategy determination method provided by this embodiment, the terminal first acquires the receiving results of the first control information, the second control information and the third control information sent by the base station and the receiving results of the data on the first transport block and the data on the second transport block, and then determines the feedback strategy of the downlink receiving state according to the information receiving result and the data receiving result. Feedback according to the strategy can enable the base station to know the receiving situations of control information and data on the terminal side, improving the understanding of the base station about the transmission situation, facilitating the determination by the base station of an effective transmission strategy for subsequent transmission, and ensuring the data transmission efficiency.

This embodiment provides two feedback principles, and the feedback strategy determined according to these two feedback principles can be supported between the terminal and the base station, and the terminal can also determine the selection of the feedback principle according to the feature information such as the division transmission of the control information by the base station, thus improving the feedback flexibility.

Embodiment Five

This embodiment will describe the feedback strategy determination method provided in embodiment four in conjunction with examples.

First, for the scheme one under the feedback principle one, in this embodiment, 2 bits are used in one PUCCH resource for feeding back the downlink receiving states corresponding to the first transport block and the second transport block. Assuming here that "0" is served as the success identifier and "1" is served as the failure identifier, table 2 shows the indication information fed back by the terminal to the base station under various receiving state combinations in scheme one.

TABLE 2

| Case type | | Content of indication information |
|---|---|---|
| Case A | A1 | 00 |
| | A2 | 01 |
| | A3 | 10 |
| | A4 | 11 |
| Case B | B1 | 10 |
| | B2 | 11 |
| Case C | C1 | 01 |
| | C2 | 11 |
| Case D | \ | 11 |

The content of the indication information being "Null" represents that the indication information is empty, i.e., the terminal does not provide feedback to the base station. As can be seen from table 2, for the base station, the scheme one cannot allow the base station to accurately distinguish between the case types B1 and A3, and between the case types C1 and A2, and at the same time cannot allow the base station to distinguish among the case types A4, B2, C2 and D.

The main reason for the above indistinguishable situation is that when the terminal determines the feedback strategy, there is no distinction between a case where the second-level control information corresponding to a transport block is not correctly received and detected, and a case where the second-level control information is correctly received but the corresponding data receiving result is a failure, so that the base station cannot determine the receiving success rate of the second-level control information.

For the scheme two, the terminal uses 3 bits in one PUCCH resource to feed back the downlink receiving states corresponding to the first transport block and the second transport block. It is to be noted that in this scheme, "0" and "1" are not respectively served as the success identifier and the failure identifier. Table 3 shows the indication information fed back by the terminal to the base station under various receiving state combinations in the scheme two.

TABLE 3

| Case type | | Content of indication information |
|---|---|---|
| Case A | A1 | 000 |
| | A2 | 001 |
| | A3 | 010 |
| | A4 | 011 |
| Case B | B1 | 100 |
| | B2 | 101 |
| Case C | C1 | 110 |
| | C2 | 110 |
| Case D | \ | Null |

If the terminal selects to use two PUCCH resources to respectively feed back the downlink receiving states of the first transport block and the second transport block, where a first PUCCH resource corresponds to the first transport block and is used for feeding back the first indication information, while a second PUCCH resource corresponds to the second transport block and is used for feeding back the second indication information, "0" is served as the success identifier, and "1" is served as the failure identifier, table 4 shows the first indication information and the second indication information fed back by the terminal to the base station under various receiving state combinations in the scheme three.

TABLE 4

| Case type | | Content of first indication information | Content of second indication information |
|---|---|---|---|
| Case A | A1 | 0 | 0 |
|  | A2 | 0 | 1 |
|  | A3 | 1 | 0 |
|  | A4 | 1 | 1 |
| Case B | B1 | 1 | 0 |
|  | B2 | 1 | 1 |
| Case C | C1 | 0 | 1 |
|  | C2 | 1 | 1 |
| Case D | \ | 1 | 1 |

In the scheme three, after the base station uses the first PUCCH resource to receive the first indication information and uses the second PUCCH resource to receive the second indication information, the base station needs to combine the first indication information and the second indication information to determine the state of the terminal receiving the current downlink transmission. Of course, even in this case, the base station still cannot accurately distinguish between the case types B1 and A3, and between the case types C1 and A2, and cannot distinguish among the case types A4, B2, C2 and D. The reason is that when the terminal determines the indication information, there is still no distinction between the case where the second-level control information corresponding to a transport block is not correctly received and detected, and the case where the second-level control information is correctly received but the corresponding data receiving result is a failure.

In the scheme four, the terminal still selects to use two PUCCH resources to respectively feed back the downlink receiving states of the first transport block and the second transport block, where the first PUCCH resource corresponds to the first transport block and is used for feeding back the first indication information, while the second PUCCH resource corresponds to the second transport block and is used for feeding back the second indication information, "0" continues to be served as the success identifier, and "1" continues to be served as the failure identifier.

However, in the scheme four, when the second-level control information corresponding to a transport block is not received correctly, the terminal will consider that the overall control information corresponding to the transport block is not successfully received. Therefore, no feedback is provided to the base station. Based on the above description, the indication information fed back by the terminal to the base station under the receiving states in scheme four can be obtained, as shown in table 5.

TABLE 5

| Case type | | Content of first indication information | Content of second indication information |
|---|---|---|---|
| Case A | A1 | 0 | 0 |
|  | A2 | 0 | 1 |
|  | A3 | 1 | 0 |
|  | A4 | 1 | 1 |
| Case B | B1 | Null | 0 |
|  | B2 | Null | 1 |
| Case C | C1 | 0 | Null |
|  | C2 | 1 | Null |
| Case D | \ | Null | Null |

"Null" in table 5 represents that the corresponding indication information is empty, i.e., the terminal does not provide feedback to the base station. In the scheme four, after the base station uses the first PUCCH resource to receive the first indication information and uses the second PUCCH resource to receive the second indication information, the base station needs to combine the receiving situations of the first indication information and the second indication information as well as the content of the received indication information to determine the state of the terminal receiving the current downlink transmission. But in this scheme, the base station may accurately know and distinguish each information receiving result and each data receiving result of the terminal in the current downlink receiving process.

This embodiment provides a more detailed description of each feedback strategy determination scheme provided by the embodiment four. Moreover, in the scheme two and scheme four provided, the terminal provides feedback (including no feedback) according to the determined feedback strategy, and when the first information receiving result is a success, the base station can be enabled to effectively know the second information receiving result, the third information receiving result, the first data receiving result corresponding to the first transport block, and the second data receiving result corresponding to the second transport block, so as to timely maintain and adjust the downlink transmission strategy according to the downlink receiving situation of the terminal.

Embodiment Six

Figure 5:
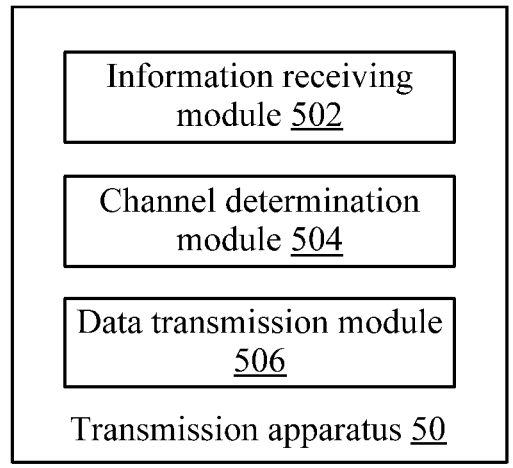
FIG. 5 is a structural diagram of a transmission apparatus according to an embodiment six of the present disclosure.

This embodiment provides a transmission apparatus. Referring to FIG. 5, the transmission apparatus 50 includes an information receiving module 502, a channel determination module 504, and a data transmission module 506. The information receiving module 502 is configured to receive, through a first control channel, first control information sent by a base station. In some examples of this embodiment, the information receiving module 502 may be further configured to receive second control information. The channel determination module 504 is configured to determine a transmission configuration parameter of a data channel according to the first control information and preset control information when the information receiving module 502 does not obtain the second control information from the base station. The data transmission module 506 is configured to perform a data transmission according to the transmission configuration parameter of the data channel. The first control information and the second control information are used for jointly indicating a transmission configuration of the data channel, and the first control information and the preset control information are used for jointly indicating a transmission configuration of the data channel.

The first control information may be used for indicating a part of the transmission configuration of the data channel. It should be understood that when two pieces of transmission configuration information are required for indicating the transmission configuration of the data channel, the channel determination module 504 cannot correctly determine the data channel when the information receiving module 502 receives only one piece of control information. Assuming that four transmission configuration items A, B, C and D are required for determining one data channel, it can be understood that if the configuration value of any one of the four transmission configuration items A, B, C and D changes, the data channel determined by the channel determination module 504 will be different. The first control information merely includes a configuration value A1 of the transmission configuration item A and a configuration value B1 of the transmission configuration item B, and transmission configuration items C and D with different configuration values may be combined with the first control information to determine different data channels. Therefore, even if the information receiving module 502 correctly detects and receives the first control information to obtain the configuration value A1 of the transmission configuration item A and the configuration value B1 of the transmission configuration item B, the channel determination module 504 cannot obtain the data channel for performing the data transmission with the base station.

In this embodiment, the first control information may include a presence indication used for indicating whether second control information exists. The second control information may indicate the configuration value of the transmission configuration item not indicated in the first control information, that is, indicate the remaining part of the transmission configuration of the data channel. Therefore, the first control information and the second control information may jointly indicate one piece of data information. After the information receiving module 502 receives the first control information, if it is determined through analysis that the first control information includes the presence indication, which indicates that the base station has sent the second control information; otherwise, it indicates that the base station does not send the second control information, that is, the second control information does not exist.

In some examples of this embodiment, the second control information may include at least one of several types of information, such as PMI information, a number of transmission layers, MCS information, and a transmission beam.

In conjunction with the aforementioned description, it can be seen that the case where the information receiving module 502 does not obtain the second control information from the base station may be either one of the two cases described below.

In a first case, the base station itself does not send the second control information, for example, the first control information does not include the presence indication, so it is impossible for the information receiving module 502 to receive and obtain the second control information from the base station side.

In a second case, the base station has sent the second control information, and the first control information includes a presence indication of the second control information, but the information receiving module 502 does not correctly detect the second control information, so the information receiving module 502 also fails to obtain the second control information from the base station. In some examples of this embodiment, the channel determination module 504 needs to determine, according to the first control information, whether the second control information exists, so even if the base station has sent the first control information and the second control information, the information receiving module 502 will receive the first control information first, and then receives the second control information according to the indication of the first control information. Therefore, a time sequence may exist in the process of receiving the first control information and the second control information, or it may be said that the receiving result of the first control information will affect the receiving process of the second control information: if the first control information cannot be correctly received by the terminal, it is basically impossible for the information receiving module 502 to correctly receive the second control information. It can be seen that it is very important to ensure that the first control information transmitted on the first control channel is correctly received.

In one example of this embodiment, the transmission configuration of the first control information for transmitting the first control information is generally better than the transmission configuration of the second control channel for transmitting the second control information. The first control channel has better parameters such as the BLER and better overall robustness than the second control channel.

When the information receiving module 502 fails to obtain the second control information from the base station side, in the traditional transmission scheme, the transmission apparatus 50 cannot continue the data transmission with the base station, but in this embodiment, the transmission apparatus 50 pre-stores preset control information, and the preset control information may indicate other transmission configuration items which are not indicated in the first control information. Therefore, the preset control information and the first control information may jointly determine the data channel. For example, the first control information indicates the configuration values of the transmission configuration items A and B of the data channel, and then the preset control information may indicate the configuration values of the remaining transmission configuration items C and D. Assuming that the preset control information indicates C1 and D1 respectively for the transmission configuration items C and D, the data transmission module 506 of the transmission apparatus 50 may determine a data channel according to A1, B1, C1 and D1 to continue the data transmission with the base station.

In this embodiment, the preset control information may include at least one of first preset control information or second preset control information. The first preset control information is determined by a pre-agreement between the terminal and the base station, for example, a corresponding manager inputs and sets the first preset control information on the terminal side and the base station side. The second preset control information may be configured and generated by the base station and then transmitted to the terminal through a higher layer. The higher layer here refers to a layer above a physical layer, for example, a layer above the physical layer in an OSI reference model or a TCP/IP five-layer model.

When the preset control information merely includes the first preset control information, the channel determination module 504 may determine the data channel according to the first control information and the first preset control information; when the preset control information merely includes the second preset control information, the channel determination module 504 may determine the data channel according to the first control information and the second preset control information. When the preset control information includes both the first preset control information and the second preset control information, the channel determination module 504 can randomly select one of the first preset control information or the second preset control information to combine with the first control information for determining the data channel.

In some examples of this embodiment, when the preset control information includes both the first preset control information and the second preset control information, the channel determination module 504 may select, according to whether the first control information includes a presence indication, one of them to determine the data channel. For example, when the presence indication is not included in the first control information, the channel determination module 504 selects the first preset control information to determine the data channel jointly with the first control information, and when the presence indication is included in the first control information, the channel determination module 504 selects the second preset control information to determine the data channel collectively with the first control information. Compared with the aforementioned method of randomly selecting either one of the two to determine the data channel, this scheme of selecting different preset control information according to different situations avoids multiple attempts and is conducive to improving the efficiency of the data transmission between two ends, since this selection method has a principle and when the base station also knows the principle, the base station can have a greater chance to know which data channel should be selected before the data transmission is performed, so as to cooperate with the terminal to achieve a data transmission. In some examples of this embodiment, in different data transmission processes, the transmitted data services have different characteristics, so the first control information has different characteristics, for example, the content included in the first control information is different. In this case, the content in the preset control information used for cooperating with the first control information will also be different. To avoid individually agreeing or transmitting the preset control information for each data transmission configuration, in some examples of this embodiment, the terminal side may pre-store one piece of unified control information, and the unified control information may include many transmission configuration items for indicating the transmission configuration of a data channel or even all transmission configuration items. For example, in one example of this embodiment, the unified control information pre-stored on the side of the transmission apparatus 50 includes configuration values A1, B1, C1, and D1 for four transmission configuration items A, B, C, and D. When the information receiving module 502 obtains merely the first control information from the base station, according to the transmission configuration items already included in the first control information, the transmission configuration items not included in the first control information may be selectively extracted by the channel determination module 504 from the unified control information to constitute the preset control information. For example, when the first control information includes A2 and C5, the channel determination module 504 may extract B1 and D1 to constitute the preset control information. When the first control information includes A1 and D3, the channel determination module 504 may extract B1 and C1 to constitute the preset control information.

It can be understood that when the second control information exists, the transmission configuration of the data channel determined jointly by the first control information and the second control information may be different from or the same as the transmission configuration of the data channel determined by the first control information and the set of the preset control information. In other words, the configuration value of a transmission configuration item in the second control information may be different from or the same as the configuration value of the corresponding transmission configuration item in the preset control information.

After the channel determination module 504 determines the data channel according to the first control information and the preset control information, the data transmission module 506 may use this data channel to perform a data transmission with the base station. When the base station does not send the second control information, the information receiving module 502 may determine according to the first control information whether the base station has sent the second control information, and meanwhile, the base station naturally knows that itself has not sent the second control information, so these two ends may directly perform the data transmission according to the data channel determined by the first control information and the preset control information. Moreover, if the transmission apparatus 50 and the base station have pre-agreed to select which preset control information to determine the data channel, when the second control information does not exist, the transmission apparatus 50 and the base station may directly determine a same data channel to complete the data transmission, thus avoiding the occurrence of a data transmission failure caused by an inconsistent selection of the preset control information by the transmission apparatus 50 and the base station.

It should be understood that the aforementioned "data transmission" includes an uplink data transmission and a downlink data transmission. In the case where the base station has sent the second control information, if the transmission apparatus 50 serves as a data sending end, the data transmission module 506 may send the data to the base station according to the data channel determined by the preset control information and the first control information. The base station may also use the preset control information and the first control information to determine the data channel, thus receiving the data sent by the data transmission module 506. Of course, the base station may assume in advance that the information receiving module 502 has received the second control information, and determine the data channel according to the first control information and the second control information first to receive the data. If the data fails to be received, the base station may determine the data channel according to the first control information and the preset control information to receive the data. Of course, the base station may first determine the data channel according to the first control information and the preset control information to receive the data, and after the data fails to be received, receives the data on the data channel determined by the first control information and the second control information.

If the transmission apparatus 50 is served as a data receiving end, the transmission apparatus 50 may feed back the receiving situation of control information to the base station. Then, the base station sends data according to the feedback message, or the base station sends data on the data channel determined by the first control information and the second control information; on the other hand, the base station also sends data on the data channel determined by the first control information and the preset control information, so that the transmission apparatus 50 can always receive data through one of the data channels determined above.

The transmission apparatus 50 provided in this embodiment may be used to implement any one of the transmission methods described in the embodiments one to three, and for the details of implementing the transmission methods and the like, reference is made to the descriptions in the aforementioned embodiments and repetition is not made here. In this embodiment, the transmission apparatus 50 may be deployed on a terminal. The functions of the information receiving module 502 and the data transmission module 506 may be collectively implemented by a communication apparatus and a processor of the terminal, and the functions of the channel determination module 504 may be implemented by the processor of the terminal.

According to the transmission apparatus provided by this embodiment of the present disclosure, when the transmission apparatus 50 cannot obtain the second control information, for indicating a part of the transmission configuration of a data channel, from the base station side, the transmission apparatus 50 may determine a data channel jointly according to the predetermined preset control information and the first control information, and continues to perform the data transmission with the base station based on the data channel, thus avoiding the situation that the data transmission process is forced to be delayed since the second control information cannot be obtained, and improving the data transmission efficiency, which also avoids the user service being affected, and ensures the user experience.

Embodiment Seven

Figure 6:
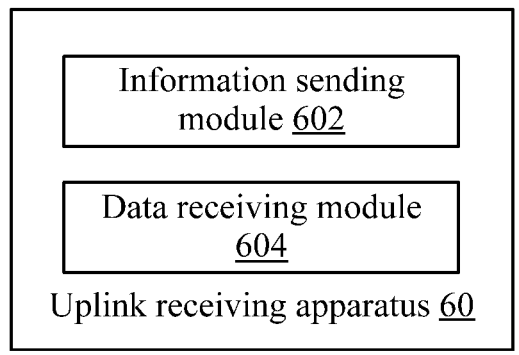
FIG. 6 is a structural diagram of an uplink receiving apparatus according to an embodiment seven of the present disclosure.

This embodiment provides an uplink receiving apparatus. Referring to FIG. 6, the uplink receiving apparatus 60 includes an information sending module 602 and a data receiving module 604. The information sending module 602 is configured to send, through a first control channel, first control information to a terminal. The data receiving module 604 is configured to: determine, according to the first control information and preset control information, a transmission configuration parameter of a data channel for performing a data transmission with the terminal, and receive, through the transmission configuration parameter, data sent by the terminal.

The information sending module 602 sends the first control information to the terminal through the first control channel, and the first control information may indicate a part of the transmission configuration of a data channel. The other part of the transmission configuration of the data channel may be indicated by other control information. In this embodiment, the information sending module 602 may send second control information for indicating the remaining part of the transmission configuration of the data channel to the terminal, or may not send the second control information to the terminal. In a case where the information sending module 602 sends the second control information, the information sending module 602 may uses the first control information to carry a presence indication, and indicates through the presence indication to the terminal that the second control information exists since the information sending module 602 has sent the second control information. In addition, in some examples of this embodiment, the first control information sent by the information sending module 602 may also indicate a second control channel for carrying the second control information, so that the terminal detects and receives the second control information on the corresponding second control channel when determining that the second control information exists. If the information sending module 602 does not send the second control information, the presence indication does not need to be carried in the first control information. In this case, after the terminal receives the first control information, it may be determined that the information sending module 602 does not send the second control information, so the second control information does not exist.

After the information sending module 602 sends the first control information to the terminal, the data receiving module 604 may use the first control information and the pre-stored preset control information to determine the data channel so as to receive the data sent by the terminal. Of course, the data sent by the terminal may be received on such data channel only when the terminal fails to obtain the second control information. The reason is that, if the terminal obtains the second control information, the terminal will usually combine the first control information and the second control information to determine a data channel and send the data by using the data channel.

Two cases may be included in which the terminal cannot obtain the second control information from the side of the uplink receiving apparatus 60, which have been described in the embodiment one. These two cases are mainly the case in which the uplink receiving apparatus 60 does not send the second control information itself and the case in which the uplink receiving apparatus 60 has sent the second control information but the terminal side fails to successfully receive the second control information.

Thus, in some examples of this embodiment, the data receiving module 604 may determine the data channel merely according to a joint indication of the first control information and the preset control information. For example, in the case where the information sending module 602 does not send the second control information, the terminal must use the first control information and the preset control information to determine the data channel since it is impossible for the terminal side to receive the second control information anyway in this case.

In other examples of this embodiment, the data receiving module 604 may determine the data channel between the base station and the terminal by using the first control information and the preset control information, and may also determine a data channel according to the indication of the first control information and the second control information. This scheme is applicable to the case where the information sending module 602 has sent the second control information, i.e., the first control information carries the presence indication, since the terminal is likely to receive the second control information in this case. In some examples, the data receiving module 604 may combine the above two methods when determining the data channel.

For example, the data receiving module 604 determines one data channel (assuming a data channel M) by using the first control information and the second control information, and also determines one data channel (assuming a data channel N) by using the first control information and the preset control channel, and data receiving is performed on the data channel M and data channel N at the same time. Alternatively, the data receiving module 604 uses one of the data information to receive the data, and when a data receiving result cannot pass the check, then uses the other data channel to receive the data. For example, the information sending module 602 has sent the second control information, so, in an exemplary embodiment, the data receiving module 604 may use the first control information and the second control information to jointly determine the data channel, which, however, requires the terminal side to have a relatively high success rate of receiving the second control information, for example, at least more than 50%, since only in this case will the possibility of the terminal using the second control information to determine the data channel be greater than the possibility of using the preset control information to determine the data channel. On the contrary, if the success rate of receiving the second control information on the terminal side is relatively low, for example, less than 50%, the terminal is more likely to determine the data channel by using the first control information and the preset control information. Therefore, the data receiving module 604 may make statistics on the situation of the terminal side receiving the second control information, so as to determine which method is selected first to determine the data channel, thus avoiding the situation of a data receiving failure and waste of transmission time and transmission resources since mismatched control information is selected.

As has been described in embodiment one, the preset control information includes at least one of the first preset control information or the second preset control information. In this embodiment, the preset control information used by the side of the uplink receiving apparatus 60 is the same as the preset control information used by the terminal side. Therefore, the preset control information in this embodiment also includes the first preset control information and/or the second preset control information. In this embodiment, the first control channel and the second control channel respectively used for transmitting the first control information and the second control information are both physical layer channels, while the preset control information is usually not transmitted by the base station to the terminal through a physical layer. Therefore, the terminal may acquire the preset control information in a manner other than the manner for acquiring the second control information.

When the preset control information merely includes the first preset control information, the base station may determine the data channel according to the first control information and the first preset control information; when the preset control information merely includes the second preset control information, the base station may determine the data channel according to the first control information and the second preset control information. When the preset control information includes both the first preset control information and the second preset control information, the base station may randomly select one of the first preset control information or the second preset control information to combine with the first control information for determining the data channel. In some examples of this embodiment, when the preset control information includes both the first preset control information and the second preset control information, the data receiving module 604 may select, according to whether the data receiving module 604 has sent the second control information itself, one of them to determine the data channel. For example, when the second control information is not sent, the data receiving module 604 selects the first preset control information to determine the data channel collectively with the first control information, or when the second control information has been sent, the data receiving module 604 selects the second preset control information to determine the data channel jointly with the first control information. Compared with the aforementioned method of randomly selecting either one of the two to determine the data channel, this scheme of selecting different preset control information according to different situations avoids multiple attempts and is conducive to improving the efficiency of a data transmission between two ends since this selection method has a principle and when the terminal also knows the principle, the terminal can have a greater chance to know which data channel should be selected before the data transmission is performed, so as to cooperate with the data receiving module 604 to achieve the data transmission.

It should be understood that in a transmission data transmission scheme, it is also possible for the uplink receiving apparatus 60 to send only one piece of the control information to the terminal to indicate the terminal to perform a data transmission, which, however, is not the same as the scheme in this embodiment in which the uplink receiving apparatus 60 merely sends the first control information and does not send the second control information for a following reason: in the traditional data transmission scheme, when the uplink receiving apparatus 60 sends merely one piece of the control information to the terminal, the scheme belongs to a single-level control information transmission scheme, so all transmission configuration items for determining the data channel should be included in the transmission information, however, in this embodiment, not all the transmission configuration items that may determine one data channel are included in the first control information.

The uplink receiving apparatus provided in this embodiment may be used to implement any one of the uplink receiving methods described in the embodiments one to three, and for the details of implementing the uplink receiving method and the like, reference is made to the descriptions in the aforementioned embodiments and repetition is not made here. In this embodiment, the uplink receiving apparatus 60 may be deployed on the base station. The functions of the information sending module 602 and the data receiving module 604 may be implemented collectively by a communication apparatus and a processor of the base station.

In this embodiment, after sending the first control information for indicating the data channel to the terminal, the uplink receiving apparatus may determine the data channel jointly according to the predetermined preset control information and the first control information, and performs the data transmission with the terminal based on the data channel, thus avoiding effects on the data transmission efficiency, the system throughput, and the user experience of the terminal side due to the fact that when the terminal cannot obtain the second control information, the data transmission between two ends cannot be performed and the transmission process is stalled.

Embodiment Eight

Figure 7:
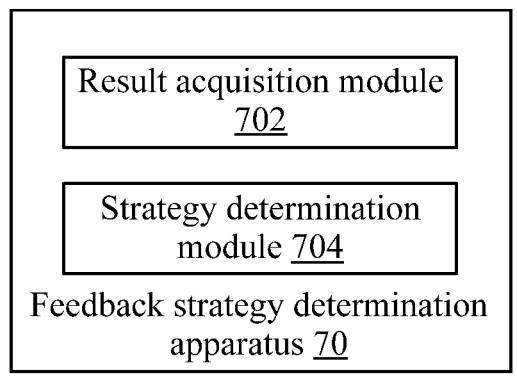
FIG. 7 is a structural diagram of a feedback strategy determination apparatus according to an embodiment eight of the present disclosure.

This embodiment provides a feedback strategy determination apparatus. Referring to FIG. 7, the feedback strategy determination apparatus 70 includes a result acquisition module 702 and a strategy determination module 704. The result acquisition module 702 is configured to acquire an information receiving result and a data receiving result, where the first control information and the second control information are used for collectively indicating a transmission configuration of a first transport block. The strategy determination module 704 is configured to determine a feedback strategy of a downlink receiving state according to the information receiving result and the data receiving result.

In this embodiment, the information receiving result refers to a result of the terminal receiving the control information sent by the base station. In some examples, the base station sends first control information to the terminal through a first channel and second control information to the terminal through a second channel, so the information receiving result correspondingly includes a receiving result of the first control information and a receiving result of the second control information. The first control information belongs to first-level control information and may include an indication of whether second-level control information exists, and information indicating a number of pieces of the second-level control information when the second-level control information exists. The second control information belongs to the second-level control information. The first control information and the second control information may jointly indicate or collectively indicate the transmission configuration of the first transport block.

In some examples, the base station will also send third control information to the terminal through a third channel. The third control information is similar to the second control information and also belongs to the second-level control information. Therefore, the first control information includes a presence indication representing the presence of the second-level control information and indicating the presence of two pieces of the second-level control information. The first control information and the second control information may be used for collectively indicating the transmission configuration of the first transport block, and the first control information and the third control information collectively indicate a transmission configuration of a second transport block. It should be understood that the first transport block and the second transport block may be different transport blocks belonging to different data channels, or may be different transport blocks belonging to a same data channel. Therefore, in these examples, the information receiving result includes a first information receiving result for the first control information, a second information receiving result for the second control information, and a third information receiving result for the third control information.

In this embodiment, the first channel, the second channel and the third channel may be control channels or data channels. In some examples of this embodiment, the first channel is a control channel, and the second channel and the third channel may be data channels.

The data receiving result in this embodiment refers to the result of the terminal detecting and receiving the data sent by the base station. If the control information sent by the base station merely includes the first control information and the second control information, i.e., merely the first transport block exists, the data receiving result is a first data receiving result of the terminal receiving data transmitted on the first transport block. When the control information sent by the base station further includes the third control information, the data receiving result includes the first data receiving result of the terminal receiving the data transmitted on the first transport block and a second data receiving result of the terminal receiving data transmitted on the second transport block.

In this embodiment, the receiving results of the first control information, the second control information and the third control information by the terminal are collectively referred to as the information receiving result. The information receiving result includes the first information receiving result for the first control information, the second information receiving result for the second control information, and the third information receiving result for the third control information. The receiving results of the terminal receiving the data on the first transport block and the data on the second transport block are collectively referred to as the data receiving result. The data receiving result includes the first data receiving result corresponding to the first transport block and the second data receiving result corresponding to the second transport block. It should be understood that the information receiving result will affect the data receiving result to some extent. If the second information receiving result in the information receiving result is a failure, the terminal cannot determine the transmission configuration for the first transport block according to the first control information and the second control information, so the first data receiving result naturally cannot be a success. Therefore, when the terminal acquires the information receiving result and the data receiving result, it does not necessarily require the terminal to completely perform the receiving of control information and the receiving of data. Similarly, the first control information generally includes the presence indication used for indicating whether the second-level control information exists, and may also include information for indicating data of the second-level control information, therefore, if the first information receiving result corresponding to the first control information is a failure, the terminal is almost unlikely to receive the second control information and the third control information, and even less likely to receive data from the first transport block and from the second transport block. Therefore, the feedback strategy determination method provided in this embodiment is based on a case where the first control information is successfully received, that is, it is assumed that the first information receiving result is always a success.

When the result acquisition module 702 obtains the information receiving result and the data receiving result, the strategy determination module 704 may determine the feedback strategy of the downlink receiving state according to the information receiving result and the data receiving result. In this embodiment, the feedback strategy determined by the strategy determination module 704 may be to send information to the base station for feedback or may be not to send information to the base station for feedback since sending information and not sending information belong to different feedback states, and the base station may also determine the receiving state of the terminal according to no feedback information sent by the strategy determination module 704.

Several modes in which the strategy determination module 704 determines the indication information for feedback when the base station merely sends the first control information and the second control information are described below.

A mode one: the indication information includes a first control indication, a second control indication and a data receiving indication, the first control indication is determined according to the receiving result of the first control information, the second control indication is determined according to the receiving result of the second control information, and the data receiving indication is determined according to the receiving result of the data on the first transport block. In short, the mode one is to independently provide feedback for the first control information, the second control information and the data receiving result. Of course, the independent feedback here does not refer to that feedback for each receiving result is sent as an independent message and merely indicates that the indication information for feedback includes identification information respectively for indicating each receiving situation. Therefore, one, two or three pieces of indication information may be provided.

For example, assuming that "0" is served as a success identifier and "1" is served as a failure identifier, if the terminal correctly receives the first control information and the second control information, the first control indication is "0" in the indication information for feedback; and if the second control information fails to be received, the second control indication is "1". Of course, in this case, the data receiving result of the terminal is also a failure, so the data receiving indication is also "1". It should be understood that in this example, "0" is served as the success identifier and "1" is served as the failure identifier for the receiving result of the first control information, the receiving result of the second control information and the data receiving result. However, in some examples of this embodiment, the success identifiers and failure identifiers of the receiving result of the first control information, the receiving result of the second control information and the data receiving result are different. For example, "0" and "1" are respectively served as the success identifier and the failure identifier for the receiving result of the first control information, "a" and "b" are respectively served as the success identifier and the failure identifier for the receiving result of the second control information, and "m" and "n" are respectively served as the success identifier and the failure identifier for the data receiving result. In this case, even if the receiving result of the first control information is a success and the receiving result of the second control information and the data receiving result are each a failure, the content of the indication information is different from the content in the previous example, in this example, the indication information includes three identifiers of "0", "b" and "n".

A mode two: the indication information includes a control indication and a data receiving indication, the control indication is determined according to the information receiving result, and the data receiving indication is determined according to the data receiving result.

In this feedback mode, the strategy determination module 704 indicates the receiving results of the first control information and the second control information to the base station through the control indication. If the receiving result of the first control information and the receiving result of the second control information are each a success, that is, the information receiving result is a success, the control indication includes a success identifier; otherwise, the control indication may include a failure identifier, or no feedback may be performed. That is, as long as one of the receiving result of the first control information or the receiving result of the second control information is a failure, the control indication in the indication information does not include the success identifier. The data receiving indication is determined according to the data receiving result. If the data transmitted on the first transport block is successfully received, the data receiving indication includes a success identifier; if the data transmitted on the first transport block is not successfully received, a failure identifier is included.

A mode three: the indication information includes a first control indication and an information data indication, the first control indication is determined according to the receiving result of the first control information, and the information data indication is determined according to the receiving result of the second control information and the data receiving result.

In this scheme of determining feedback, the strategy determination module 704 will independently feed back the receiving result of the first control information, so that the base station may clearly know the situation of the strategy determination module 704 receiving the first control information, and the strategy determination module 704 feeds back the receiving situation of the second control information and the receiving situation of the data on the first transport block to the base station as a whole. For example, when the receiving result of the first control information is a failure, the first control indication includes the failure identifier; when the receiving result of the first control information is a success, the first control indication includes the success identifier. Since the receiving situation of the second control information and the receiving situation of the data are jointly fed back, only when the data receiving result is a success will the information data indication sent by the strategy determination module 704 include the success identifier; otherwise, the success identifier will not be included. This means that only when the terminal successfully receives the second control information and the data receiving result is also a success will the strategy determination module 704 feed back the information data indication including the success identifier to the base station.

When the base station sends only the first control information and the second control information, the feedback strategy determination apparatus 70 may decide, according to feature information about the second control information, to use in following two manners to determine which of the above three modes is used for determining the feedback strategy. Alternatively, the feedback strategy determination apparatus 70 first acquires the feature information about the second control information, and then determines the selected mode according to the feature information. The feature information here includes an information content and/or a transmission channel type.

In some examples of this embodiment, the feedback strategy determination apparatus 70 may decide how to determine the feedback strategy according to an indication from the base station. For example, the base station may send feedback mode indication information to the feedback strategy determination apparatus 70, and when the feedback strategy determination apparatus 70 receives the feedback mode indication information, the feedback mode designated by the base station may be determined according to the feedback mode indication information, and then the feedback strategy is determined according to the feedback mode.

A scheme in which the strategy determination module 704 determines the feedback strategy when the base station sends the first control information, the second control information and the third control information is described below. Two feedback principles are described first.

A feedback principle one: the strategy determination module 704 feeds back a downlink receiving state corresponding to the first transport block and a downlink receiving state corresponding to the second transport block to the base station through one uplink control channel resource.

Under this feedback principle, the base station merely allocates one uplink control channel resource for the terminal to feed back the downlink receiving states corresponding to the two transport blocks. For example, an uplink control channel resource, a PUCCH resource allocated by the base station is used for feedback. Therefore, the strategy determination module 704 needs to feed back information that may reflect receiving results of the first control information and the second control information and the data receiving result of the first transport block, and the information reflecting the receiving results of the first control information and the third control information and the data receiving result of the second transport block is fed back to the base station through the uplink control channel resource.

It should be understood that the information receiving results and the data receiving results respectively corresponding to the two transport blocks need to be fed back to the base station through a same resource, so under this feedback principle, the situation, in which only the information receiving result and the data receiving result corresponding to one transport block are fed back but the information receiving result and the data receiving result corresponding to the other transport block are not fed back, cannot occur.

A feedback principle two: the strategy determination module 704 feeds back the downlink receiving state corresponding to the first transport block to the base station through a first uplink control channel resource corresponding to the first transport block, and feeds back the downlink receiving state corresponding to the second transport block to the base station through a second uplink control channel resource corresponding to the second transport block.

Under this feedback principle, each piece of the second-level control information corresponds to one uplink control channel resource. In other words, each transport block corresponds to one uplink control channel resource. Therefore, when the downlink receiving state corresponding to each transport block is fed back, the adopted resource is independent, and the situation, in which feedback is performed on the downlink receiving state corresponding to one transport block and no feedback is performed on the downlink receiving state corresponding to the other transport block, may occur.

Two feedback principles are provided in this embodiment, so when the strategy determination module 704 determines the feedback strategy for downlink receiving, the strategy determination module 704 may determine a corresponding feedback strategy based on either one of the feedback principles. Therefore, the strategy determination module 704 may determine, based on using the feedback principle one, the feedback strategy of the downlink receiving state according to the information receiving result and the data receiving result, or determine, based on using the feedback principle two, the feedback strategy of the downlink receiving state according to the information receiving result and the data receiving result.

In some examples of this embodiment, the strategy determination module 704 may determine, according to the feature information about the second-level control information, whether to adopt the feedback principle one or the feedback principle two to determine the feedback strategy. If the second-level control information includes the second control information and the third control information, the strategy determination module 704 may make a selection according to the feature information about one of the second control information or the third control information, alternatively, based on at least one of the information content or the transmission channel type of the second control information/third control information. For example, if the second control information and the third control information are transmitted in a PDSCH region, the terminal may select to determine the feedback strategy according to the feedback principle two; if the second control information and the third control information are transmitted in a CORESET region, the strategy determination module 704 may select to determine the feedback strategy according to the feedback principle one. In short, when the base station performs a division transmission on the control information, different dividing principles, transmission modes and other factors will affect the selection of the feedback principle by the terminal.

In the above example, the scheme in which the terminal decides the feedback principle according to the feature information about the first control information and/or the second control information is described. In some examples of this embodiment, the base station may indicate the selection of the feedback principle to the strategy determination module 704 through feedback principle indication information, so that when the strategy determination module 704 receives the feedback principle indication information sent by the base station, the strategy determination module 704 may select the corresponding one from the feedback principle one and the feedback principle two, and then determine the corresponding feedback strategy according to the feedback principle.

The scheme of the strategy determination module 704 selecting to use the feedback principle one to determine the feedback strategy is described below.

Scheme One

The strategy determination module 704 may determine indication information fed back to the base station through the uplink control channel resource, and the indication information is used for representing downlink receiving states corresponding to the first transport block and the second transport block. In this embodiment, since the downlink receiving states corresponding to the two transport blocks need to be fed back, two identification bits are included in the indication information, one identification bit corresponds to the first transport block and the other identification bit corresponds to the second transport block.

If the control information corresponding to a certain transport block is not successfully received, it is to be noted that in the scheme one, the data receiving result corresponding to this transport block will definitely fail if the second-level control information corresponding to the transport block is not successfully received. In this embodiment, if data on a certain transport block is successfully received, the indication information includes the success identifier; otherwise, the indication information includes the failure identifier. That is, in this scheme, there is no distinction between a case where the final data receiving failure is caused by the receiving failure of the second-level control information and a case where the data receiving fails while the receiving of both the first control information and the second-level control information succeeds. As long as the data receiving fails, the result is uniformly regarded as a failure.

In this embodiment, it is assumed that "0" is served as a success flag, "1" is served as a failure flag, and the indication information includes information of two flags "XY", where X corresponds to the first transport block and Y corresponds to the second transport block. Then, the indication information is "11" in a case where the first information receiving result is a success, the second information receiving result is a failure, the third receiving result is a success, the first data receiving result is a failure, and the second data receiving result is also a failure.

Scheme Two

A correspondence between a state combination and indication information is pre-stored in the feedback strategy determination apparatus 70. For example, indication information "000" corresponds to a state combination in which the receiving result of each information is a success and the receiving result of each data is also a success; and indication information "001" corresponds to a state combination in which the receiving result of each information is a success, the first data receiving result of the data receiving result is a success and the second data receiving result of the data receiving result is a failure, and so on. Therefore, in the scheme two, the strategy determination module 704 may first determine the state combination of the first information receiving result, the second information receiving result, the third information receiving result, the first data receiving result and the second data receiving result, which are all in current downlink receiving; and then, the strategy determination module 704 determines target indication information matching the state combination of the current downlink receiving according to the correspondence.

Generally, when one uplink control channel resource is used to feed back the downlink receiving states corresponding to the two transport blocks to the base station, the terminal will merely use 2 bits, but in this embodiment, even if the first receiving result corresponding to the first control information is assumed to be a success, there are still 9 cases. Table 1 shows various state combinations. "Y" represents a corresponding receiving result being a success, "N" represents a corresponding receiving result being a failure, and "-" represents that the terminal has not tried to perform receiving and demodulation on data when the second-level control information corresponding to a transport block fails to be received. Of course, "-" may be regarded as a case of a failure of the receiving result, and may also be replaced by "N".

Therefore, to make the 9 states shown in table 1 each have corresponding indication information, in this embodiment, 3 bits may be used for the indication information, the 3 binary bits may represent 8 cases, and the 8 cases plus a case in which the terminal does not provide feedback to the base station may represent the 9 cases in total.

It should be understood that in the aforementioned description, "000" corresponds to the state in which the information receiving result and the data receiving result are each a success, and "001" corresponds to the state in which the receiving result of each information is a success, the first data receiving result of the data receiving result is a success and the second data receiving result of the data receiving result is a failure, and so on. In other examples of this embodiment, other indication information may also be used to correspond to these states, as long as one type of indication information corresponds to one type of downlink receiving state.

The scheme of the strategy determination module 704 selecting to use the feedback principle two to determine the feedback strategy is described below.

Scheme Three

In the scheme three, the strategy determination module 704 feeds back, through the first uplink control channel resource, indication information for representing the downlink receiving state corresponding to the first transport block to the base station, and determines to feed back, through the second uplink control channel resource, indication information for representing the downlink receiving state corresponding to the second transport block to the base station. If data on a transport block is successfully received, the indication information corresponding to the transport block includes the success identifier; if data on a transport block cannot be successfully received, the indication information corresponding to the transport block includes the failure identifier. Similar to the scheme one, the strategy determination module 704 in this scheme does not distinguish between the case where the final data receiving failure is caused by the receiving failure of the second-level control information and the case where the data receiving fails while the receiving of both the first control information and the second-level control information succeeds, and as long as the data receiving fails, the result is uniformly regarded as a failure. In the scheme one, the strategy determination module 704 will use 2 bits to carry two pieces of identification information respectively corresponding to the first transport block and the second transport block, and different from the scheme one, in this embodiment, the strategy determination module 704 will use only 1 bit to carry the identification information corresponding to one transport block in one piece of the indication information. For example, assuming that the first data receiving result corresponding to the first transport block is a failure, the failure identifier is carried in the indication information sent on the first uplink control channel resource. Assuming that the second data receiving result corresponding to the second transport block is a success, the success identifier is carried in the indication information sent on the second uplink control channel resource.

Scheme Four

In this scheme, if the data receiving result corresponding to a transport block finally fails due to the fact that the second-level control information corresponding to the transport block fails to be received, the strategy determination module 704 considers that the receiving of the control information fails, so, in conjunction with a traditional feedback strategy (in the traditional feedback strategy, if the control information is not received, the terminal does not provide feedback to the base station, and if the control information is successfully received but the data receiving result is a failure, the terminal feeds back an NACK message to the base station; if the control information is successfully received and the data receiving result is a success, the terminal feeds back ACK information to the base station), when the control information is not successfully received, no feedback is provided to the base station.

Therefore, in this embodiment, for a certain transport block, if the second information receiving result corresponding to the transport block is a failure, the strategy determination module 704 determines not to feed back the downlink receiving state corresponding to the transport block to the base station; otherwise, only when the data receiving result corresponding to the transport block is also a success will the strategy determination module 704 determine to feed back the indication information including the success identifier to the base station through the corresponding uplink control channel resource, or, when the data receiving result corresponding to the transport block is a failure, the strategy determination module 704 will determine to feed back the indication information including the failure identifier to the base station through the corresponding uplink control channel resource.

For example, when the second information receiving result is a failure, the strategy determination module 704 determines not to feed back the downlink receiving state corresponding to the first transport block to the base station; otherwise, when the first data receiving result is a success, the strategy determination module 704 determines to feed back the indication information including the success identifier to the base station through the first uplink control channel resource, or when the first data receiving result is a failure, the strategy determination module 704 determines to feed back the indication information including the failure identifier to the base station through the first uplink control channel resource.

When the third information receiving result is a failure, the strategy determination module 704 determines not to feed back the downlink receiving state corresponding to the second transport block to the base station; otherwise, when the second data receiving result is a success, the strategy determination module 704 determines to feed back the indication information including the success identifier to the base station through the second uplink control channel resource, or when the second data receiving result is a failure, the strategy determination module 704 determines to feed back the indication information including the failure identifier to the base station through the second uplink control channel resource.

The feedback strategy determination apparatus 70 is used for implementing one of the feedback strategy determination methods described in the embodiment four or five, and for the details of implementing the feedback strategy determination method and the like, reference is made to the descriptions in the aforementioned embodiment and repetition is not made here. In this embodiment, the feedback strategy determination apparatus 70 may be deployed on a terminal. The functions of the result acquisition module 702 and the strategy determination module 704 may be implemented by a processor of the terminal.

According to the feedback strategy determination apparatus provided by this embodiment, the feedback strategy determination apparatus first acquires the receiving results of the first control information, the second control information and the third control information sent by the base station and the receiving results of data on the first transport block and the second transport block, and then determines the feedback strategy of the downlink receiving state according to the information receiving result and the data receiving result. Feedback according to the strategy can enable the base station to know the receiving situations of control information and data on the terminal side, improving the understanding of the base station about the transmission situation, facilitating the determination by the base station of an effective transmission strategy for subsequent transmission, and ensuring the data transmission efficiency.

This embodiment provides two feedback principles, and the feedback strategy determined according to the two feedback principles can be supported between the feedback strategy determination apparatus and the base station, and the feedback strategy determination apparatus can also determine the selection of the feedback principle according to the feature information such as the division transmission of the control information by the base station, thus improving the feedback flexibility.

Embodiment Nine

This embodiment provides a storage medium. The storage medium may store one or more computer programs that may be read, compiled and executed by one or more processors. In this embodiment, the storage medium may store at least one of a transmission program, an uplink receiving program, or a feedback strategy determination program. The transmission program may be executed by the one or more processors to implement any one of the transmission methods described in the embodiments one to three. The uplink receiving program may be executed by the one or more processors to implement any one of the uplink receiving methods described in the embodiments one to three. The feedback strategy determination program may be executed by the one or more processors to implement any one of the feedback strategy determination methods described in the embodiment four or five.

Figure 8:
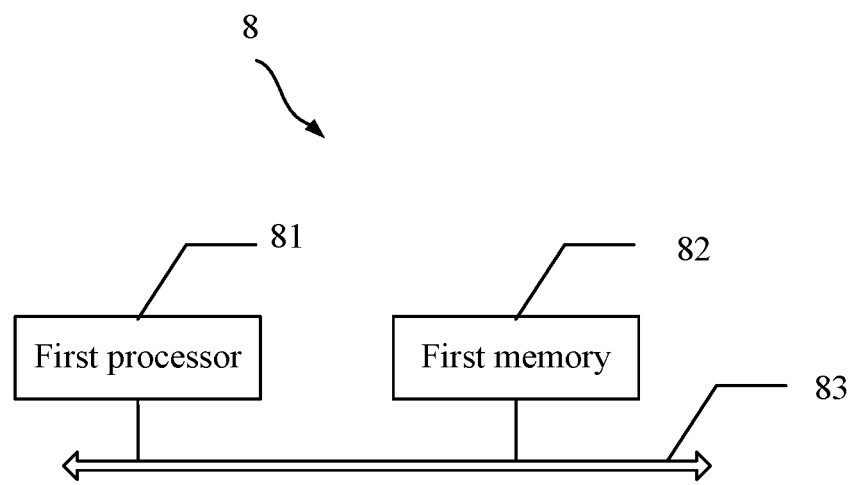
FIG. 8 is a structural diagram of hardware of a terminal according to an embodiment nine of the present disclosure.

This embodiment further provides a terminal. FIG. 8 is a structural diagram of hardware of the terminal.

The terminal 8 includes a first processor 81, a first memory 82, and a first communication bus 83 for connecting the first processor 81 and the first memory 82. The first memory 82 may be the aforementioned storage medium in which the transmission program is stored. The first processor 81 may read and compile the transmission program stored in the first memory 82 to execute any one of the transmission methods described in the embodiments one to three; or the first memory 82 may be the aforementioned storage medium in which the feedback strategy determination program is stored. The first processor 81 may read and compile the feedback strategy determination program stored in the first memory 82 to execute any one of the feedback strategy determination method described in the embodiment four or five.

Figure 9:
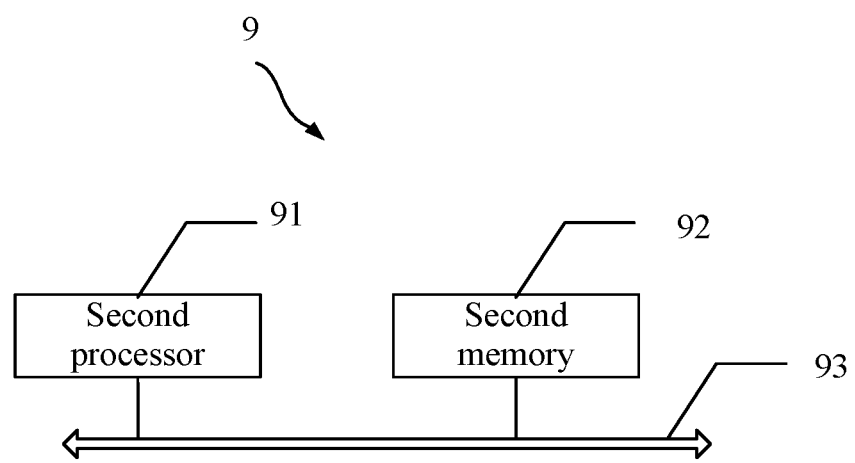
FIG. 9 is a structural diagram of hardware of a base station according to an embodiment nine of the present disclosure.

This embodiment further provides a base station. FIG. 9 is a structural diagram of hardware of the base station.

The base station 9 includes a second processor 91, a second memory 92, and a second communication bus 93 for connecting the second processor 91 and the second memory 92. The second memory 92 may be the aforementioned storage medium in which the uplink receiving program is stored. The second processor 91 may read and compile the uplink receiving program stored in the second memory 92 to execute any one of the uplink receiving methods described in the embodiments one to three.

According to the transmission apparatus, the uplink receiving apparatus, the terminal, the base station and the storage medium provided in the embodiments, when the second control information is not obtained from the base station, the data channel is determined according to the first control information and the preset control information, and the data transmission is performed with the base station through the data channel. In this case, even if the terminal does not correctly receive the second control information sent by the base station, the terminal can replace the second control information with the preset control information and determine the data channel for performing the data transmission jointly according to the preset control information and the first control information.

The feedback strategy determination apparatus, the terminal and the storage medium provided in the embodiments can enable the base station to know the receiving situations of control information and data on the terminal side, making the base station know more about the transmission situation, facilitating the determination by the base station of an effective transmission strategy for subsequent transmission, and ensuring the data transmission efficiency. It should be understood by those skilled in that art that the transmission method, the uplink receiving method, the feedback strategy determination method, the corresponding apparatuses, the base station, the terminal and the storage medium provided in the embodiments of the present disclosure may be applied not only to a fifth-generation (5G) communication system, but also to any future communication system.

Apparently, it should be understood by those skilled in the art that each of the modules or steps in the embodiments of the present disclosure described above may be implemented by a general-purpose computing apparatus, the modules or steps may be concentrated on a single computing apparatus or distributed on a network composed of multiple computing apparatuses, and alternatively, the modules or steps may be implemented by program codes executable by the computing apparatuses, so that the modules or steps may be stored in a computer storage medium (such as a read only memory (ROM)/random access memory (RAM), a magnetic disk or an optical disk) and executed by the computing apparatuses. In some circumstances, the illustrated or described steps may be executed in sequences different from those described herein, or the modules or steps may be made into various integrated circuit modules separately, or multiple modules or steps therein may be made into a single integrated circuit module for implementation. Therefore, the present disclosure is not limited to any combination of hardware and software. The above content is a further detailed description of the present disclosure in conjunction with the embodiments, and the implementation of the present disclosure is not limited to the descriptions. For those skilled in the art to which the present disclosure pertains, a number of simple deductions or substitutions may be made without departing from the concept of the present disclosure and should fall within the scope of the present disclosure.

What is claimed is:

1. A transmission method, comprising:
   receiving, through a first control channel, first control information sent by a base station;
   in a case of not obtaining second control information from the base station, determining a transmission configuration parameter of a data channel according to the first control information and preset control information; and
   performing a data transmission according to the transmission configuration parameter of the data channel;
   wherein the first control information and the second control information are used for jointly indicating a transmission configuration of the data channel; or the first control information and the preset control information are used for jointly indicating the transmission configuration of the data channel;
   wherein the case of not obtaining the second control information from the base station comprises one of:
   a case one: the first control information comprises a presence indication used for indicating presence of the second control information, but the second control information is not correctly detected; or
   a case two: the first control information does not comprise a presence indication used for indicating presence of the second control information;
   wherein the preset control information comprises first preset control information pre-agreed with the base station and second preset control information received from a higher layer; and wherein
   for the case one, determining the transmission configuration parameter of the data channel according to the first control information and the preset control information comprises:
   determining the transmission configuration parameter of the data channel according to the first control information and the second preset control information;
   for the case two, determining the transmission configuration parameter of the data channel according to the first control information and the preset control information comprises: determining the transmission configuration parameter of the data channel according to the first control information and the first preset control information.

2. A transmission apparatus, applied to the transmission method of claim 1, configured in a terminal, comprising: a first processor and a first memory;
   wherein the first memory stores a transmission program, and the transmission program, when executed by the first processor, comprises:
   an information receiving module, configured to receive, through a first control channel, first control information sent by a base station;
   a channel determination module, configured to: in a case of not obtaining second control information from the base station, determine a transmission configuration parameter of a data channel according to the first control information and preset control information; wherein the first control information and the second control information are used for jointly indicating a transmission configuration of the data channel, or the first control information and the preset control information are used for jointly indicating a transmission configuration of the data channel; and
   a data transmission module, configured to perform a data transmission according to the transmission configuration parameter of the data channel.

3. An uplink receiving method, comprising:
   sending, through a first control channel, first control information to a terminal;
   determining, according to the first control information and preset control information, a transmission configuration parameter of a data channel for performing a data transmission with the terminal; and
   receiving, through the transmission configuration parameter, data sent by the terminal;
   wherein the first control information and the preset control information jointly indicate a transmission configuration of the data channel;
   wherein the preset control information comprises first preset control information pre-agreed with a base station and second preset control information received from a higher layer;
   wherein determining, according to the first control information and the preset control information, the transmission configuration parameter of the data channel for performing the data transmission with the terminal comprises:
   in a case where the first control information comprises a presence indication used for indicating presence of second control information, determining, according to the first control information and the second preset control information, the transmission configuration parameter of the data channel for performing the data transmission with the terminal; and
   in a case where the first control information does not comprise the presence indication used for indicating the presence of the second control information, determining, according to the first control information and the first preset control information, the transmission configuration parameter of the data channel for performing the data transmission with the terminal.

4. The uplink receiving method of claim 3, wherein in a case where the first control information comprises the presence indication used for indicating the presence of the second control information,
   before determining, according to the first control information and the preset control information, the transmission configuration parameter of the data channel for performing the data transmission with the terminal, the method further comprises: after receiving, through a data channel indicated by the first control information and the second control information, the data sent by the terminal, performing a check on a data receiving result and determining that the check on the data receiving result fails;
   or
   after receiving, through the transmission configuration parameter of the data channel, the data sent by the terminal, the method further comprises: performing a check on a data receiving result, and in a case where the check on the data receiving result fails, receiving, through a data channel indicated by the first control information and the second control information, the data sent by the terminal;

or in response to receiving, through the transmission configuration parameter of the data channel, the data sent by the terminal, the method further comprises: receiving, through a data channel indicated by the first control information and the second control information, the data sent by the terminal.

5. An uplink receiving apparatus, applied to the uplink receiving method of claim 3, configured in a base station, comprising: a second processor and a second memory;

wherein the second memory stores an uplink receiving program, and the uplink receiving program, when executed by the second processor, comprises:

an information sending module, configured to send, through a first control channel, first control information to a terminal; and a data receiving module, configured to: determine, according to the first control information and preset control information, a transmission configuration parameter of a data channel for performing a data transmission with the terminal, and receive, through the transmission configuration parameter, data sent by the terminal; wherein the first control information and the preset control information jointly indicate a transmission configuration of the data channel.

6. A feedback strategy determination method, comprising:

acquiring an information receiving result and a data receiving result; wherein the information receiving result comprises a first information receiving result of first control information sent by a base station on a first channel and a second information receiving result of second control information sent by the base station on a second channel, and the data receiving result comprises a receiving result of data on a first transport block; and determining a feedback strategy of a downlink receiving state according to the information receiving result and the data receiving result;

wherein the first control information and the second control information are used for collectively indicating a transmission configuration of the first transport block.

7. The feedback strategy determination method of claim 6, wherein determining the feedback strategy of the downlink receiving state according to the information receiving result and the data receiving result comprises determining indication information for feedback according to one of following modes:

a mode one: the indication information comprises a first control indication, a second control indication and a data receiving indication, the first control indication is determined according to the first information receiving result of the first control information, the second control indication is determined according to the second information receiving result of the second control information, and the data receiving indication is determined according to the receiving result of the data on the first transport block;

a mode two: the indication information comprises a control indication and a data receiving indication, the control indication is determined according to the information receiving result, and the data receiving indication is determined according to the data receiving result; or a mode three: the indication information comprises a first control indication and an information data indication, the first control indication is determined according to the first information receiving result of the first control information, and the information data indication is determined according to the receiving result of the second control information and the data receiving result.

8. The feedback strategy determination method of claim 7, before determining the feedback strategy of the downlink receiving state according to the information receiving result and the data receiving result, further comprising:

acquiring feature information about the second control information, and selecting, according to the feature information, one of the mode one, the mode two or the mode three to determine the feedback strategy of the downlink receiving state; or selecting, according to feedback mode indication information sent by the base station, one of the mode one, the mode two or the mode three to determine the feedback strategy of the downlink receiving state.

9. The feedback strategy determination method of claim 6, wherein the information receiving result further comprises a third information receiving result of third control information sent by the base station on a third channel, and the data receiving result further comprises a receiving result of data on a second transport block; and the first control information and the third control information are used for collectively indicating a transmission configuration of the second transport block.

10. The feedback strategy determination method of claim 9, wherein determining the feedback strategy of the downlink receiving state according to the information receiving result and the data receiving result comprises:

determining, based on using a feedback principle one, the feedback strategy of the downlink receiving state according to the information receiving result and the data receiving result, wherein the feedback principle one comprises: feeding back, through one uplink control channel resource, a downlink receiving state corresponding to the first transport block and a downlink receiving state corresponding to the second transport block to the base station; or determining, based on using a feedback principle two, the feedback strategy of the downlink receiving state according to the information receiving result and the data receiving result, wherein the feedback principle two comprises: feeding back, through a first uplink control channel resource corresponding to the first transport block, a downlink receiving state corresponding to the first transport block to the base station, and feeding back, through a second uplink control channel resource corresponding to the second transport block, a downlink receiving state corresponding to the second transport block to the base station.

11. The feedback strategy determination method of claim 10, wherein determining, based on using the feedback principle one, the feedback strategy of the downlink receiving state according to the information receiving result and the data receiving result comprises:

determining indication information fed back to the base station through the uplink control channel resource;

wherein the indication information is used for representing the downlink receiving state corresponding to the first transport block and the downlink receiving state corresponding to the second transport block, in a case where data on a transport block is successfully received, the indication information comprises a success identifier corresponding to the transport block, or in a case where data on a transport block fails to be successfully received, the indication information comprises a failure identifier corresponding to the transport block.

12. The feedback strategy determination method of claim 10, wherein the first information receiving result is a success; and the data receiving result comprises a first data receiving result corresponding to the first transport block and a second data receiving result corresponding to the second transport block;
  wherein determining, based on using the feedback principle one, the feedback strategy of the downlink receiving state according to the information receiving result and the data receiving result comprises:
    determining a state combination of the first information receiving result, the second information receiving result, the third information receiving result, the first data receiving result and the second data receiving result, which are in current downlink receiving; and
    determining target indication information matching the state combination of the current downlink receiving according to a preset correspondence between a state combination and indication information.

13. The feedback strategy determination method of claim 10, wherein determining, based on using the feedback principle two, the feedback strategy of the downlink receiving state according to the information receiving result and the data receiving result comprises:
  determining to feed back, through the first uplink control channel resource, indication information for representing the downlink receiving state corresponding to the first transport block to the base station, and
  determining to feed back, through the second uplink control channel resource, indication information for representing the downlink receiving state corresponding to the second transport block to the base station;
  wherein in a case where data on a transport block is successfully received, the indication information corresponding to the transport block comprises a success identifier; and in a case where data on a transport block fails to be successfully received, the indication information corresponding to the transport block comprises a failure identifier.

14. The feedback strategy determination method of claim 10, wherein the first information receiving result is a success; and the data receiving result comprises a first data receiving result corresponding to the first transport block and a second data receiving result corresponding to the second transport block;
  wherein determining, based on using the feedback principle two, the feedback strategy of the downlink receiving state according to the information receiving result and the data receiving result comprises:
    in a case where the second information receiving result is a failure, determining not to feed back the downlink receiving state corresponding to the first transport block to the base station; otherwise, in a case where the first data receiving result is a success, determining to feed back, through the first uplink control channel resource, indication information comprising a success identifier to the base station, or in a case where the first data receiving result is a failure, determining to feed back, through the first uplink control channel resource, indication information comprising a failure identifier to the base station;
    in a case where the third information receiving result is a failure, determining not to feed back the downlink receiving state corresponding to the second transport block to the base station; otherwise, in a case where the second data receiving result is a success, determining to feed back, through the second uplink control channel resource, the indication information comprising the success identifier to the base station, or in a case where the second data receiving result is a failure, determining to feed back, through the second uplink control channel resource, the indication information comprising the failure identifier to the base station.

15. The feedback strategy determination method of claim 10, before determining the feedback strategy of the downlink receiving state according to the information receiving result and the data receiving result, further comprising:
  acquiring feature information about at least one of the second control information or the third control information, and determining, according to the feature information, whether the feedback principle one or the feedback principle two is used to determine the feedback strategy of the downlink receiving state; or
  determining, according to feedback principle indication information sent by the base station, whether the feedback principle one or the feedback principle two is used to determine the feedback strategy of the downlink receiving state.

16. The feedback strategy determination method of claim 15, wherein the feature information comprises at least one of an information content or a transmission channel type.

17. A feedback strategy determination apparatus, applied to the feedback strategy determination method of claim 6, configured in a terminal, comprising: a first processor and a first memory;
  wherein the first memory stores a feedback strategy determination program, and the feedback strategy determination program, when executed by the first processor, comprises:
    a result acquisition module, configured to acquire an information receiving result and a data receiving result; wherein the information receiving result comprises a receiving result of first control information sent by a base station on a first channel and a receiving result of second control information sent by the base station on a second channel, and the data receiving result comprises a receiving result of data on a first transport block; and the first control information and the second control information are used for collectively indicating a transmission configuration of the first transport block; and
    a strategy determination module, configured to determine a feedback strategy of a downlink receiving state according to the information receiving result and the data receiving result.

* * * * *